(12) United States Patent
Fujii et al.

(10) Patent No.: US 12,523,325 B2
(45) Date of Patent: Jan. 13, 2026

(54) COMPLEX CONNECTOR AND COMPLEX CONNECTOR STRUCTURE

(71) Applicant: TOYODA GOSEI CO., LTD., Kiyosu (JP)

(72) Inventors: Hiroto Fujii, Kiyosu (JP); Shota Suzuki, Kiyosu (JP); Tomokazu Sobajima, Kiyosu (JP); Tsukasa Nakai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/930,782

(22) Filed: Oct. 29, 2024

(65) Prior Publication Data

US 2025/0172227 A1 May 29, 2025

(30) Foreign Application Priority Data

Nov. 29, 2023 (JP) .................................. 2023-202285
Mar. 12, 2024 (JP) .................................. 2024-038128

(51) Int. Cl.
*F16L 37/56* (2006.01)
*F16L 37/12* (2006.01)

(52) U.S. Cl.
CPC ........... *F16L 37/56* (2013.01); *F16L 37/1225* (2013.01)

(58) Field of Classification Search
CPC ....... F16L 37/12; F16L 37/1225; F16L 37/14; F16L 37/142; F16L 37/144; F16L 37/56; F16L 37/565

See application file for complete search history.

(56) References Cited

U.S. PATENT DOCUMENTS

| | | | |
|---|---|---|---|
| 5,865,474 A | 2/1999 | Takahashi | |
| 2005/0285390 A1* | 12/2005 | Martin | F16L 37/18 285/124.5 |
| 2006/0202475 A1* | 9/2006 | Gunderson | F16L 37/144 285/305 |
| 2008/0014774 A1* | 1/2008 | Hagen | F16L 5/12 439/157 |
| 2015/0000776 A1 | 1/2015 | Sunagawa | |
| 2018/0043317 A1* | 2/2018 | Kimberlin | F04C 2/344 |
| 2022/0178481 A1* | 6/2022 | Gocha | F16L 37/0885 |

(Continued)

FOREIGN PATENT DOCUMENTS

JP 2015-009317 A 1/2015

*Primary Examiner* — Aaron M Dunwoody
(74) *Attorney, Agent, or Firm* — Posz Law Group, PLC

(57) ABSTRACT

A timing at which a compression amount in a radial direction of an annular sealing member becomes maximum during a connection operation between a body portion and a mating portion in a complex connector structure differs between a first connector structure portion which is one of connector structure portions and a second connector structure portion which is another one of the connector structure portions. Alternatively, in the complex connector structure, a body assembling portion of each of body connection portions allows change in a relative position between a front-side divisional part and a rear-side divisional part in a radial direction of the body connection portion and restricts change in a relative position between the front-side divisional part and the rear-side divisional part in an axial direction of the body connection portion.

18 Claims, 12 Drawing Sheets

(56) References Cited

U.S. PATENT DOCUMENTS

| | | | |
|---|---|---|---|
| 2023/0096609 A1* | 3/2023 | Frederiksen | F16L 37/1225 137/561 R |
| 2024/0019059 A1* | 1/2024 | Kowol | F16L 37/1225 |
| 2024/0077160 A1* | 3/2024 | Zhang | F16L 37/56 |

* cited by examiner

COMPLEX CONNECTOR AND COMPLEX CONNECTOR STRUCTURE

TECHNICAL FIELD

The present disclosure relates to: a complex connector in which a plurality of body portions are integrated; and a complex connector structure including a plurality of mating portions and a plurality of annular sealing members in addition to the complex connector.

BACKGROUND ART

A complex connector structure including a plurality of connector structure portions each including a body portion having a tubular shape and a mating portion connected to the body portion has been known. In this type of complex connector structure, the body portion and the mating portion are typically connected by inserting a body connection portion of the body portion into a mating connection portion of the mating portion or inserting the mating connection portion into the body connection portion.

In this complex connector structure, the body portions are integrated with each other to form a complex connector (see, for example, JPH11-101380 (A) and JP2015-9317 (A)). The integration of the body portions with each other leads to advantages that: the complex connector structure is downsized; and connection between each of the body portions and the corresponding mating portion is performed through a single operation.

Interposition of an annular sealing member between the body portion and the mating portion in the above complex connector structure has also been known.

The annular sealing member is, when the body portion and the mating portion are connected, disposed between the body connection portion and the mating connection portion in a state where the annular sealing member is compressed in a radial direction thereof. This disposition is for isolating a tube inside of the complex connector structure from the outside with high sealability.

SUMMARY OF INVENTION

Technical Problem

[1]

Meanwhile, in the complex connector structure having such annular sealing members, the following insertion needs to be performed during a connection operation between each of the body portions and the corresponding mating portion. That is, the body connection portion of the body portion needs to be inserted into the mating connection portion of the mating portion while the corresponding annular sealing member is being compressed from a natural state, or the mating connection portion needs to be inserted into the body connection portion while the annular sealing member is being compressed from the natural state. In order to isolate the tube inside of the complex connector structure from the outside with high sealability, a comparatively large load is necessary for the compression of the annular sealing member.

This type of complex connector structure includes a plurality of connector structure portions each including: a body portion; a mating portion; and an annular sealing member. In this complex connector structure, since the body portions are integrated with each other, each of the body portions and the corresponding mating portion are connected through a single operation.

In such a complex connector structure, a connection operation load applied during connection between each of the body portions and the corresponding mating portion is mainly derived from compression of the corresponding annular sealing member, and thus increase in the number of the annular sealing members sometimes leads to excessive increase in the connection operation load.

Therefore, a problem arises in that the connection operation in this type of complex connector structure is difficult. Thus, there is a first circumstance in which a connector structure that has the above complex connector and that enables a connection operation between each of the body portions and the corresponding mating portion to be easily performed is desired.

[2]

In addition, the body portions in the above complex connector structure are integrated with each other, and thus the positions of the body portions are hardly changed relative to each other. When the positions of the body portions are hardly changed relative to each other, a problem arises in that, in cases such as a case where the relative position between the body connection portions or the relative position between the body connection portions and the mating connection portions is displaced, the displacement is hardly accommodated during a connection operation between each of the body portions and the corresponding mating portion, for example. Consequently, this problem leads to other problems such as: a problem that the connection operation is not easily performed; and a problem that the connection operation is complicated.

In particular, when the positions of the mating portions are also hardly changed relative to each other in the complex connector structure in which the body portions are integrated with each other as described above, there is a case where displacement of neither the relative position between the body connection portions nor the relative position between the body connection portions and the mating connection portions is allowed during the above connection operation. In this case, the connection operation between each of the body portions and the corresponding mating portion becomes further difficult. This difficulty raises a concern that, in some cases, any of the body portions or the mating portions is damaged during the connection operation.

The complex connector structure is obtained by integrating a plurality of members such as the plurality of body portions, and a slight error regarding the shape and dimension of any of the portions in the complex connector structure sometimes occurs at the time of molding or assembling. Even when the error regarding the portion in the complex connector structure is minor, such minor errors are accumulated in the complex connector structure, and thus there is a concern that displacement of the relative position between the body connection portions or the relative position between the body connection portions and the mating connection portions influences the connection operation between each of the body portions and the corresponding mating portion.

Therefore, for the complex connector structure in which the body portions are integrated with each other as described above, both the body portions and the mating portions are required to be molded with high molding accuracy, and relative positions between the portions (specifically, the relative position between the body connection portions, the relative position between the body connection portions and the mating connection portions connected thereto, and the relative position between the mating connection portions) are required to be accurately controlled.

Considering these requirements, the positions of a plurality of mating portions are enabled to be separately changed so that mating connection portions are connected to body connection portions one by one as in, for example, a complex connector structure introduced in JP2015-9317 (A). This manner of connection is considered to enable, in cases such as a case where a relative position between the portions is displaced, the displacement to be accommodated during a connection operation between each of the body connection portions and the corresponding mating connection portion, whereby a connection operation between each of the body portions and the corresponding mating portion is comparatively easily performed.

However, when the plurality of mating portions are formed such that the positions thereof are enabled to be mutually changed, the mating portions sometimes become bulky in the complex connector structure in which the body portions are integrated with each other. Consequently, the outer shape of the entirety of the complex connector structure becomes excessively large. This excessively large outer shape sometimes leads to: difficulty in installing this complex connector structure in a desired place; and occurrence of a problem in terms of combination between this complex connector structure and another device. In addition, the mating portions becoming bulky as described above also raises a concern that the handleability of the complex connector structure deteriorates. Furthermore, even when the positions of the plurality of mating portions are enabled to be changed relative to each other, there is also a case where the change in the positions of the mating portions is hindered depending on use of the complex connector structure, the place in which the complex connector structure is installed, or the like.

Therefore, there is also a second circumstance in which configuring of the complex connector structure such that the positions of the plurality of mating portions are enabled to be mutually changed is not unconditionally considered as a desirable manner of configuring.

The present disclosure has been made in view of the above first and second circumstances, and the following items [1] and [2] are objects to be achieved.

[1] In view of the first circumstance, a first object to be achieved is to provide a complex connector and a complex connector structure that each enable, even though being or having a complex connector in which a plurality of body portions are integrated with each other, a connection operation between each of the body portions and a corresponding mating portion to be easily performed.

[2] In view of the second circumstance, a second object to be achieved is to provide technologies which are a complex connector structure in which a plurality of body portions are integrated with each other and a plurality of mating portions are integrated with each other and a complex connector included in this complex connector structure, the complex connector structure and the complex connector enabling a connection operation between each of the body portions and the corresponding mating portion to be performed while allowing displacement of relative positions between the portions.

Solution to Problem

[1]

A first complex connector structure of the present disclosure for achieving the above first object is a complex connector structure including
    a plurality of connector structure portions each including:
        a body portion having a tubular shape;
        a mating portion connected to the body portion; and
        an annular sealing member interposed between the body portion and the mating portion, wherein
    the body portions are integrated with each other to form a complex connector,
    each of the body portions and the corresponding mating portion are connected by inserting a body connection portion of the body portion into a mating connection portion of the mating portion or inserting the mating connection portion into the body connection portion,
    the annular sealing member is, when the body portion and the mating portion are connected, disposed between the body connection portion and the mating connection portion in a state where the annular sealing member is compressed in a radial direction thereof, and
    a timing at which a compression amount in the radial direction of the annular sealing member becomes maximum during a connection operation between the body portion and the mating portion differs between a first connector structure portion which is one of the connector structure portions and a second connector structure portion which is another one of the connector structure portions.

The first complex connector structure of the present disclosure particularly suitably satisfies one of the following requirements (a) to (d):

(a) a requirement that
    each of the body connection portions has a body seal-equipped portion equipped with the corresponding annular sealing member in advance, and
    the body seal-equipped portion of a first body portion which is one of the body portions and which is included in the first connector structure portion and the body seal-equipped portion of a second body portion which is another one of the body portions and which is included in the second connector structure portion are located at positions different from each other in a relative insertion direction for the body connection portions and the mating connection portions;

(b) a requirement that
    each of the mating connection portions has a mating seal-equipped portion equipped with the corresponding annular sealing member in advance, and
    the mating seal-equipped portion of a first mating portion which is one of the mating portions and which is included in the first connector structure portion and the mating seal-equipped portion of a second mating portion which is another one of the mating portions and which is included in the second connector structure portion are located at positions different from each other in a relative insertion direction for the body connection portions and the mating connection portions;

(c) a requirement that
    each of the body connection portions has a body seal-equipped portion equipped with the corresponding annular sealing member in advance, and
    a front end portion of the mating connection portion of a first mating portion which is one of the mating portions and which is included in the first connector structure portion and a front end portion of the mating connection portion of a second mating portion which is another one of the mating portions and which is included in the second connector structure portion are located at positions different from each other in a relative insertion direction for the body connection portions and the mating connection portions; or (d) a requirement that each of the mating connection portions has a mating seal-equipped portion equipped with the corresponding annular sealing member in advance, and a front end portion of the body connection portion of a first body portion which is one of the body portions and which is included in the first connector structure portion and a front end portion of the body connection portion of a second body portion which is another one of the body portions and which is included in the second connector structure portion are located at positions different from each other in a relative insertion direction for the body connection portions and the mating connection portions.

A first complex connector of the present disclosure for achieving the above first object is a complex connector including a plurality of body portions each having a tubular shape, the plurality of body portions being integrated with each other, wherein each of the body portions has a body connection portion which is inserted into a mating connection portion of a mating portion or into which the mating connection portion is inserted, and the complex connector satisfies the following requirement (e) or (f):

(e) a requirement that each of the body connection portions has a body seal-equipped portion equipped with an annular sealing member in advance, and the body seal-equipped portion of a first body portion which is one of the body portions and the body seal-equipped portion of a second body portion which is another one of the body portions are located at positions different from each other in a relative insertion direction for the body connection portions and the mating connection portions; or (f) a requirement that none of the body connection portions has a body seal-equipped portion equipped with an annular sealing member in advance, and a front end portion of the body connection portion of a first body portion which is one of the body portions and a front end portion of the body connection portion of a second body portion which is another one of the body portions are located at positions different from each other in a relative insertion direction for the body connection portions and the mating connection portions.

[2]

A second complex connector structure of the present disclosure for achieving the above second object is a complex connector structure including:

a plurality of body portions each having a body connection portion having a tubular shape;

a plurality of mating portions each having a mating connection portion which is inserted into the corresponding body connection portion or into which the body connection portion is inserted; and a plurality of annular sealing members each interposed, when the corresponding body portion and the corresponding mating portion are connected, between the body connection portion of the body portion and the mating connection portion of the mating portion in a state where the annular sealing member is compressed in a radial direction thereof, wherein the plurality of body portions are integrated with each other, and the plurality of mating portions are integrated with each other, each of the body connection portions has a front-side divisional part having a tubular shape and located on a front side in a relative insertion direction for the corresponding mating connection portion, a rear-side divisional part having a tubular shape and located on a rear side in the relative insertion direction for the mating connection portion, and a body assembling portion integrating the front-side divisional part and the rear-side divisional part with each other, and the body assembling portion of each of the body connection portions allows change in a relative position between the front-side divisional part and the rear-side divisional part in a radial direction of the body connection portion and restricts change in a relative position between the front-side divisional part and the rear-side divisional part in an axial direction of the body connection portion.

A second complex connector of the present disclosure for achieving the above second object is a complex connector including a plurality of body portions each having a body connection portion having a tubular shape, the plurality of body portions being integrated with each other, wherein the body connection portion of each of the body portions is configured to be inserted into a mating connection portion of a mating portion or is configured such that the mating connection portion is inserted into the body connection portion, the body connection portion has a front-side divisional part having a tubular shape and located on a front side in a relative insertion direction for the mating connection portion, a rear-side divisional part having a tubular shape and located on a rear side in the relative insertion direction for the mating connection portion, and a body assembling portion integrating the front-side divisional part and the rear-side divisional part with each other, and the body assembling portion of each of the body connection portions allows change in a relative position between the front-side divisional part and the rear-side divisional part in a radial direction of the body connection portion and restricts change in a relative position between the front-side divisional part and the rear-side divisional part in an axial direction of the body connection portion.

Advantageous Effects of Invention

[1]

The first complex connector structure and the first complex connector of the present disclosure each enable, even though having or being a complex connector in which a plurality of body portions are integrated with each other, a connection operation between each of the body portions and a corresponding mating portion to be easily performed.

[2]

The second complex connector structure and the second complex connector of the present disclosure are a complex connector structure in which a plurality of body portions are integrated with each other and a plurality of mating portions are integrated with each other and a complex connector included in this complex connector structure, the complex connector structure and the complex connector enabling a connection operation between each of the body portions and the corresponding mating portion to be performed while allowing displacement of relative positions between the portions.

DESCRIPTION OF EMBODIMENTS

Figure 1:
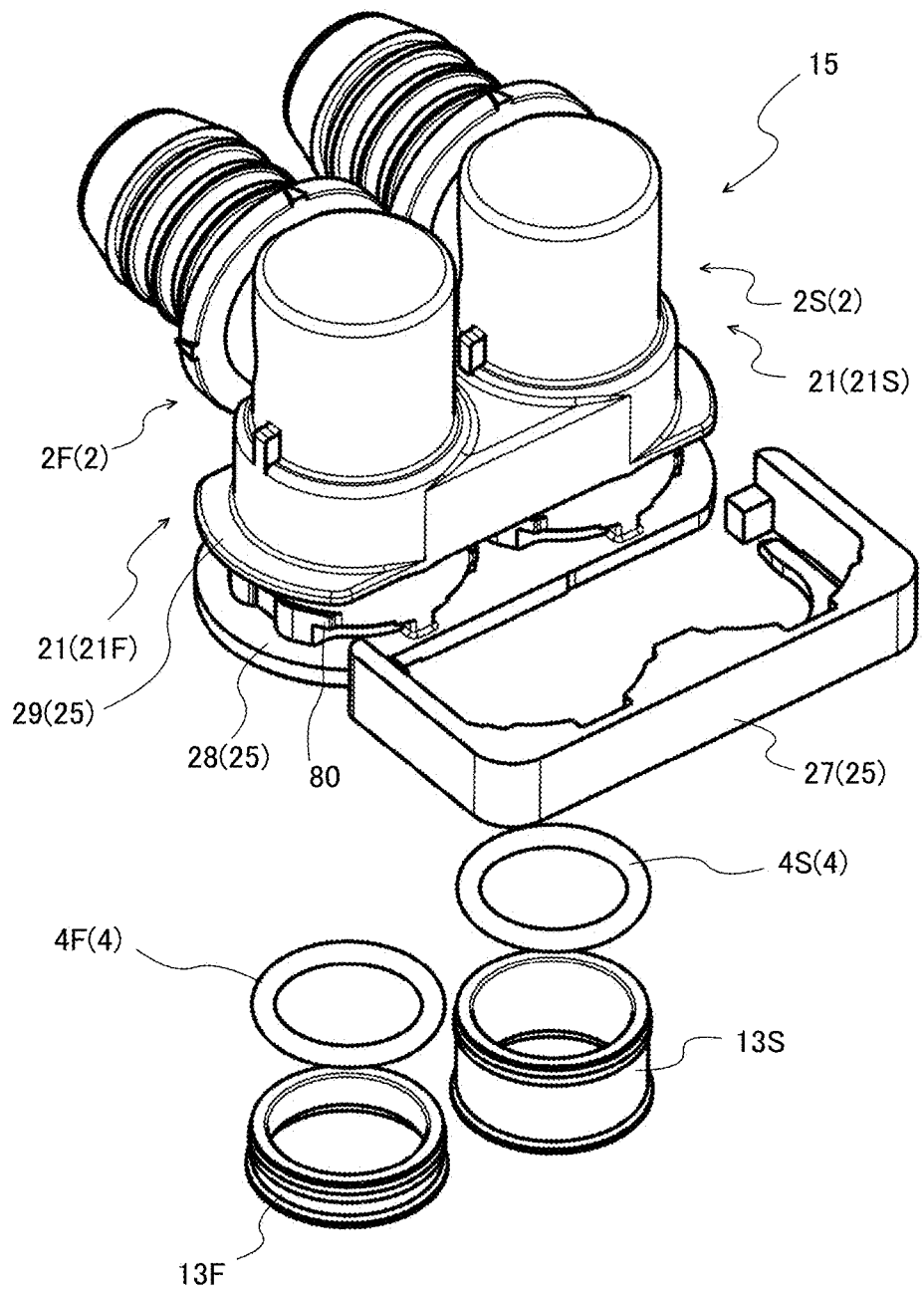
FIG. 1 is a diagram for schematically explaining a situation in which a complex connector of a complex connector structure of Example 1 has been disassembled.

Hereinafter, a first complex connector, a second complex connector, a first complex connector structure, and a second complex connector structure of the present disclosure will be described by means of specific examples.

The first complex connector of the present disclosure is one mode of the complex connector in the first complex connector structure of the present disclosure. Therefore, description of body portions and body connection portions in the following description of the first complex connector structure of the present disclosure is optionally substituted with description of body portions and body connection portions in the first complex connector of the present disclosure, unless otherwise specified.

The second complex connector of the present disclosure includes a plurality of body portions integrated with each other and is a part of the second complex connector structure of the present disclosure. Therefore, description of body portions and each portion of the body portions in the following description of the second complex connector structure of the present disclosure is optionally substituted with description of body portions and each portion of the body portions in the second complex connector of the present disclosure, unless otherwise specified.

A numerical range "x to y" described herein includes the lower limit x and the upper limit y within the range unless otherwise specified. Such a numerical range may be formed by arbitrarily combining the upper and lower limit values and numerical values described in the embodiments. Numerical values arbitrarily selected from within the numerical range may be used as upper and lower limit numerical values.

[1] First Complex Connector and First Complex Connector Structure

The first complex connector structure includes a plurality of connector structure portions each including: a body portion having a tubular shape; a mating portion connected to the body portion; and an annular sealing member interposed between the body portion and the mating portion.

In the first complex connector structure, the body portions are integrated with each other to form a complex connector, and each of the body portions and the corresponding mating portion are connected by inserting a body connection portion of the body portion into a mating connection portion of the mating portion or inserting the mating connection portion into the body connection portion. The annular sealing member is, when the body portion and the mating portion are connected, disposed between the body connection portion and the mating connection portion in a state where the annular sealing member is compressed in a radial direction thereof.

Here, in the first complex connector structure, a timing at which a compression amount in the radial direction of the annular sealing member becomes maximum during a connection operation between the body portion and the mating portion differs between a first connector structure portion which is one of the connector structure portions and a second connector structure portion which is another one of the connector structure portions.

In other words, in the first complex connector structure, the annular sealing member included in the first connector structure portion and the annular sealing member included in the second connector structure portion are compressed at different timings during the above connection operation.

With this configuration, a peak of a connection operation load generated by compressing the annular sealing member included in the first connector structure portion and a peak of a connection operation load generated by compressing the annular sealing member included in the second connector structure portion are temporally shifted from each other. As a result, a connection operation load at which each of the body portions and the corresponding mating portion are connected is, as a whole, made even to a certain extent as the time elapses from the timing of start of the connection operation to the timing of end of the connection operation. Thus, abrupt and significant increase in the connection operation load is inhibited.

Therefore, the first complex connector structure enables, even though having a complex connector in which the plurality of body portions are integrated with each other, a connection operation between each of the body portions and the corresponding mating portion to be easily performed.

Likewise, the first complex connector enables, even though being a complex connector in which the plurality of body portions are integrated with each other, a connection operation between each of the body portions and the corresponding mating portion to be easily performed.

Hereinafter, as necessary, the annular sealing member included in the first connector structure portion is referred to as first annular sealing member, and the annular sealing member included in the second connector structure portion is referred to as second annular sealing member. In addition, the body portion included in the first connector structure portion is referred to as first body portion, and the body portion included in the second connector structure portion is referred to as second body portion. Furthermore, the mating portion included in the first connector structure portion is referred to as first mating portion, and the mating portion included in the second connector structure portion is referred to as second mating portion.

In the present specification, a complex connector structure in which the first annular sealing member and the second annular sealing member are compressed at different timings during a connection operation is sometimes referred to as sequential-insertion-type complex connector structure. The first complex connector structure is a sequential-insertion-type complex connector structure.

Hereinafter, the first complex connector and the first complex connector structure will be described in relation to each constituent thereof.

The first complex connector structure includes a plurality of connector structure portions each including: a body portion having a tubular shape; a mating portion; and an annular sealing member.

In the first complex connector structure, the condition that the body portion has a tubular shape is a prerequisite, and meanwhile, the mating portion may, or does not have to, have a tubular shape.

A tube inside of the first complex connector structure is formed by at least the inside of the body portion. The tube inside may be used as a flow path for a fluid such as liquid or gas or may be used as a housing that houses an article such as a cable so as to isolate the article from the outside, for example. That is, use of the first complex connector structure is not particularly limited, and the first complex connector structure is suitably used as, for example, a flow path member that forms such a fluid flow path or a housing that houses such an article.

The body portion only has to have a tubular shape as a whole, and the shape and the material thereof are not particularly limited. For example, the body portion may have: a tubular shape having no bottom with both ends thereof in an axial direction being opened; or a tubular shape having a bottom with one or both ends thereof in the axial direction being closed.

Regarding the mating portion as well, the shape and the material thereof are not particularly limited. For example, the mating portion may have a tubular shape having no bottom or may have a tubular shape having a bottom. In a case where the mating portion does not have a tubular shape, this mating portion may be a stopper or the like for isolating the tube inside of the body portion from the outside, for example.

The body connection portion of the body portion particularly suitably has a linear tubular shape in consideration of the fact that: the body connection portion is inserted into the mating connection portion of the mating portion; or this mating connection portion is inserted into the body connection portion. In a case where the body connection portion is inserted into the mating connection portion, this mating connection portion needs to have a tubular shape. The mating connection portion in this case also particularly suitably has a linear tubular shape.

In the case where the body connection portion is inserted into the mating connection portion, the outer diameter of the body connection portion is preferably smaller than the inner diameter of the mating connection portion. Meanwhile, in a case where the mating connection portion is inserted into the body connection portion, the outer diameter of the mating connection portion is preferably smaller than the inner diameter of the body connection portion.

Hereinafter, as necessary, a portion of the body portion other than the body connection portion is referred to as body general portion, and a portion of the mating portion other than the mating connection portion is referred to as mating general portion.

As described above, the body connection portion preferably has a linear tubular shape. Meanwhile, the body general portion may have a linear tubular shape or a curved tubular shape. Alternatively, the body general portion may have a diameter-varying tubular shape (e.g., the shape of a bellows) having, in the radial direction, a length that varies along the axial direction among portions of the body general portion.

Likewise, the mating general portion may also have a linear tubular shape, a curved tubular shape, or a diameter-varying tubular shape such as the shape of a bellows. Still alternatively, the mating general portion does not have to have a tubular shape.

The body portion may be a non-deformable rigid member or a deformable flexible member. The mating portion may also be a rigid member or a flexible member.

The body portion may be composed of one member or may be obtained by assembling and integrating two or more multiple members. Likewise, the mating portion may also be composed of one member or may be obtained by assembling and integrating two or more multiple members.

The annular sealing member is, during connection, disposed between the body connection portion and the mating connection portion in a state where the annular sealing member is compressed in the radial direction thereof.

In other words, during connection, the body connection portion, the mating connection portion, and the annular sealing member are arranged in the order of the body connection portion, the annular sealing member, and the mating connection portion in a thickness direction of the connector structure portion. The annular sealing member is located at the position between the body connection portion and the mating connection portion in a state where the annular sealing member is compressed in the radial direction thereof, i.e., the thickness direction of the connector structure portion. Thus, the interval between the body connection portion and the mating connection portion is sealed at this position.

Such an annular sealing member only has to be formed from an elastic material and have an annular shape, and the material, the size, and the like thereof are not particularly limited. Basically, a material for the annular sealing member is preferably selected according to use of the body portion and the mating portion.

For example, in a case where a fluid such as gas or liquid flows through the tube inside, a material that hardly reacts with the fluid and that inhibits the fluid from passing through the annular sealing member and leaking to the outside is preferably selected according to the type of the fluid.

The annular sealing member needs to have a shape that enables the annular sealing member to be compressed between the body connection portion and the mating connection portion during connection between the body portion and the mating portion. In consideration of the necessity of sealing the interval between the body connection portion and the mating connection portion with high sealability, a material having excellent elastic restoring force is preferably selected as a material for the annular sealing member.

The first complex connector structure has a plurality of the body portions, and the body portions are integrated with each other to form a complex connector. The method for integrating the body portions is not particularly limited and may, for example, include: connecting and integrating the plurality of separate body portions with each other by using a connection member separate from the body portions; or integrally molding the plurality of body portions. The body portions may be integrated with each other such that: the positions thereof are not mutually changed; or said positions are allowed to be mutually changed slightly. However, in order to stably perform a connection operation between each of the body portions and the corresponding mating portion, the body portions are more preferably integrated with each other such that the positions thereof are not mutually changed.

Meanwhile, the mating portions may be, or do not have to be, integrated with each other, and setting as to whether or not to integrate the mating portions with each other only has to be made as appropriate according to use of the mating portions.

As described above, when each of the body portions and the corresponding mating portion are connected, the corresponding annular sealing member is located between the body connection portion and the mating connection portion, is in contact with the body connection portion and the mating connection portion, and is in a compressed state.

As a matter of course, the compression amount in the radial direction of the annular sealing member is zero or very small in a state where the body portion and the mating portion have yet to be connected. Compression of the annular sealing member in the radial direction is advanced after a connection operation between the body portion and the mating portion is started. In association with the advancement of the connection operation between the body portion and the mating portion, the compression amount in the radial direction of the annular sealing member increases, and the compression load due to the compression of the annular sealing member also increases.

Here, in the complex connector structure having the plurality of connector structure portions, when the sum of the compression loads on the respective annular sealing members rapidly increases, a connection operation load applied during connection between each of the body portions and the corresponding mating portion also rapidly increases. When the connection operation load becomes excessively large, the connection operation between the body portion and the mating portion becomes difficult to perform.

Hereinafter, as necessary, the connection operation load applied during connection between the body portion and the mating portion is sometimes simply referred to as connection operation load.

In order to solve the problem that the above connection operation load becomes excessively large, the inventor focused on the timing at which the compression amount in the radial direction of the annular sealing member becomes maximum.

In the first complex connector structure, the above timing differs between the first connector structure portion which is one of the connector structure portions and the second connector structure portion which is another one of the connector structure portions.

As is described in detail in the section regarding Examples described later, the connection operation load rapidly increases after relative insertion of each of the body connection portions and the corresponding mating connection portion is started until the body connection portion and the mating connection portion are disposed at a predetermined connection position so that the compression amount in the radial direction of the corresponding annular sealing member becomes maximum.

The relative insertion of the body connection portion and the mating connection portion mentioned here is a concept encompassing both insertion of the body connection portion into the mating connection portion and insertion of the mating connection portion into the body connection portion. Hereinafter, as necessary, the relative insertion of the body connection portion and the mating connection portion as described above is sometimes referred to as connection insertion, and the direction of the relative insertion of the body connection portion and the mating connection portion is sometimes simply referred to as insertion direction.

The inventor of the present disclosure has found that the connection operation load having been temporarily increased decreases to a certain extent when the connection insertion is further advanced after the compression amount in the radial direction of the annular sealing member becomes maximum.

The inventor has obtained the idea that, at a state where the compression amount in the radial direction of the first annular sealing member becomes maximum in the first connector structure portion, the connection insertion for the first connector structure portion is further advanced, and at the same time, connection insertion for the second connector structure portion is started. By further developing this idea, the inventor has conceived of causing the timing, at which the compression amount in the radial direction of the annular sealing member becomes maximum, to differ between the first connector structure portion and the second connector structure portion.

Effective means for causing the timing, at which the compression amount in the radial direction of the annular sealing member becomes maximum, to differ between the first connector structure portion and the second connector structure portion is as follows, for example. That is, a position at which the body connection portion and the mating connection portion are connected and at which the compression amount in the radial direction of the annular sealing member becomes maximum is set to differ in the insertion direction between the first connector structure portion and the second connector structure portion.

More specifically, a position at which the body connection portion and the mating connection portion in the first connector structure portion are connected and at which the compression amount in the radial direction of the annular sealing member in the first connector structure portion becomes maximum, and a position at which the body connection portion and the mating connection portion in the second connector structure portion are connected and at which the compression amount in the radial direction of the annular sealing member in the second connector structure portion becomes maximum, are preferably adjusted such that, during a connection operation, connection insertion in the first connector structure portion is started first, and, after the compression amount in the radial direction of the first annular sealing member in this first connector structure portion becomes maximum, connection insertion in the second connector structure portion is started.

Hereinafter, as necessary, the position at which the body connection portion and the mating connection portion are connected and at which the compression amount in the radial direction of the annular sealing member becomes maximum is sometimes simply referred to as connection position.

As described later, by adjusting the connection position in the first connector structure portion and the connection position in the second connector structure portion as described above, the maximum value of the connection operation load actually decreased, whereby the connection operation between each of the body portions and the corresponding mating portion was facilitated.

In order to cause the timing, at which the compression amount in the radial direction of the annular sealing member becomes maximum, to differ between the first connector structure portion and the second connector structure portion as described above, the connection position in the first connector structure portion and the connection position in the second connector structure portion are set to differ from each other in the insertion direction. Examples of a specific mode for this setting may include a mode in which one of the following requirements (a) to (d) is satisfied. However, the specific mode in which the connection position in the first connector structure portion and the connection position in the second connector structure portion are set to differ from each other in the insertion direction in the first complex connector structure, is not limited thereto.

The requirements (a) to (d) are:
(a) a requirement that
each of the body connection portions has a body seal-equipped portion equipped with the corresponding annular sealing member in advance, and
the body seal-equipped portion of the first body portion and the body seal-equipped portion of the second body portion are located at positions different from each other in the insertion direction;
(b) a requirement that
each of the mating connection portions has a mating seal-equipped portion equipped with the corresponding annular sealing member in advance, and
the mating seal-equipped portion of the first mating portion and the mating seal-equipped portion of the second mating portion are located at positions different from each other in the insertion direction;
(c) a requirement that
each of the body connection portions has the body seal-equipped portion, and
a front end portion of the mating connection portion of the first mating portion and a front end portion of the mating connection portion of the second mating portion are located at positions different from each other in the insertion direction; and
(d) a requirement that
each of the mating connection portions has the mating seal-equipped portion, and
a front end portion of the body connection portion of the first body portion and a front end portion of the body connection portion of the second body portion are located at positions different from each other in the insertion direction.

In order to connect each of the body portions and the corresponding mating portion to each other to obtain a connector structure portion including the body portion, the mating portion, and the corresponding annular sealing member, equipping the body connection portion or the mating connection portion with the annular sealing member in advance is important.

In a case where the body connection portion is equipped with the annular sealing member in advance, this body connection portion is preferably provided with the body seal-equipped portion to be equipped with the annular sealing member. Meanwhile, in a case where the mating connection portion is equipped with the annular sealing member in advance, this mating connection portion is preferably provided with the mating seal-equipped portion to be equipped with the annular sealing member.

Hereinafter, as necessary, the body connection portion of the first body portion is referred to as first body connection portion, the body connection portion of the second body portion is referred to as second body connection portion, the mating connection portion of the first mating portion is referred to as first mating connection portion, and the mating connection portion of the second mating portion is referred to as second mating connection portion. Also, as necessary, the body seal-equipped portion of the first body connection portion is referred to as first body seal-equipped portion, the body seal-equipped portion of the second body connection portion is referred to as second body seal-equipped portion, the mating seal-equipped portion of the first mating connection portion is referred to as first mating seal-equipped portion, and the mating seal-equipped portion of the second mating connection portion is referred to as second mating seal-equipped portion.

In the first complex connector structure, when connection insertion that involves relatively inserting the body connection portions and the mating connection portions is performed during a connection operation, the first body connection portion and the first mating connection portion are disposed at the corresponding connection position first, and then the second body connection portion and the second mating connection portion are disposed at the corresponding connection position. Alternatively, the second body connection portion and the second mating connection portion are disposed at the corresponding connection position first, and then the first body connection portion and the first mating connection portion are disposed at the corresponding connection position.

In a case where each of the body connection portions is equipped with the corresponding annular sealing member, i.e., in a case where each of the body connection portions has the body seal-equipped portion, the [requirement (a)] that the body seal-equipped portion of the first body portion and the body seal-equipped portion of the second body portion are located at positions different from each other in the insertion direction is preferably satisfied. In this case, since the first body connection portion and the second body connection portion are located at positions different from each other in the insertion direction, the connection position in the first connector structure portion and the connection position in the second connector structure portion are set to differ from each other in the insertion direction.

In this case, front end portions, i.e., end portions on the body portion side, of the mating connection portions of the mating portions may be located at positions identical to or different from each other in the insertion direction.

In a case where front-side portions, i.e., portions on the body portion side, of the mating connection portions are chamfered and the chamfered front-side portions are not in contact with the annular sealing members with which the respective body connection portions are equipped, the above front end portions of the mating connection portions mean front end portions of the mating connection portions excluding the chamfered front-side portions.

In either of the cases, the prerequisite is that "the timing at which the compression amount in the radial direction of the annular sealing member becomes maximum during a connection operation between the body portion and the mating portion differs between the first connector structure portion and the second connector structure portion". Therefore, even in the case where the front end portions of the mating connection portions of the mating portions are located at positions different from each other in the insertion direction as described above, the difference between the positions of the front end portions of the mating connection portions is within such a range as to satisfy the above prerequisite.

The above prerequisite applies also to a first complex connector structure which satisfies any of the requirements (b) to (d) described later.

In a case where each of the body connection portions has the body seal-equipped portion in the same manner as in the above requirement (a), the [requirement (c)] that the front end portion of the mating connection portion of the first mating portion and the front end portion of the mating connection portion of the second mating portion are located at positions different from each other in the insertion direction is preferably satisfied, alternatively. In this case as well, since the first mating connection portion and the second mating connection portion are located at positions different from each other in the insertion direction, the connection position in the first connector structure portion and the connection position in the second connector structure portion are set to differ from each other in the insertion direction.

In this case, front end portions, i.e., end portions on the mating portion side, of the body connection portions of the body portions may be located at positions identical to each other in the insertion direction or may be located at positions different from each other in the insertion direction within such a range as to satisfy the above prerequisite.

In a case where front-side portions of the body connection portions are chamfered and the chamfered front-side portions are not in contact with the annular sealing members with which the respective mating connection portions are equipped, the front end portions of the body connection portions mean front end portions of the body connection portions excluding the chamfered front-side portions.

Meanwhile, in a case where each of the mating connection portions is equipped with the corresponding annular sealing member, i.e., in a case where each of the mating connection portions has the mating seal-equipped portion, the [requirement (b)] that the mating seal-equipped portion of the first mating portion and the mating seal-equipped portion of the second mating portion are located at positions different from each other in the insertion direction is preferably satisfied. In this case as well, since the first mating connection portion and the second mating connection portion are located at positions different from each other in the insertion direction, the connection position in the first connector structure portion and the connection position in the second connector structure portion are set to differ from each other in the insertion direction.

In this case, the front end portions of the body connection portions of the body portions may be located at positions identical to each other in the insertion direction or may be located at positions different from each other in the insertion direction within such a range as to satisfy the above prerequisite.

In a case where each of the mating connection portions has the mating seal-equipped portion in the same manner as in the above requirement (b), the [requirement (d)] that the front end portion of the body connection portion of the first body portion and the front end portion of the body connection portion of the second body portion are located at positions different from each other in the insertion direction is preferably satisfied, alternatively. In this case as well, since the first body connection portion and the second body connection portion are located at positions different from each other in the insertion direction, the connection position in the first connector structure portion and the connection position in the second connector structure portion are set to differ from each other in the insertion direction.

In this case, the front end portions of the mating connection portions of the mating portions may be located at positions identical to each other in the insertion direction or may be located at positions different from each other in the insertion direction within such a range as to satisfy the above prerequisite.

In the first complex connector structure, the connection position in the first connector structure portion and the connection position in the second connector structure portion are set to differ from each other in the insertion direction, whereby the peak of the connection operation load generated by compressing the first annular sealing member and the peak of the connection operation load generated by compressing the second annular sealing member are temporally shifted from each other. Therefore, in the first complex connector structure, the distance in the insertion direction between the connection position in the first connector structure portion and the connection position in the second connector structure portion is not particularly limited.

Meanwhile, in order to sufficiently decrease the connection operation load generated in the first complex connector structure, the following manner of disposition is preferable, for example. That is, the first body connection portion and the first mating connection portion are disposed at the corresponding connection position, and, after the connection operation load generated at the first annular sealing member decreases to a certain extent, the second body connection portion and the second mating connection portion are disposed at the corresponding connection position. Alternatively, the second body connection portion and the second mating connection portion are disposed at the corresponding connection position first, and, after the connection operation load generated at the second annular sealing member decreases to a certain extent, the first body connection portion and the first mating connection portion are disposed at the corresponding connection position.

In order to cause connection operation loads to occur at such timings, the distance in the insertion direction between the connection position in the first connector structure portion and the connection position in the second connector structure portion is considered to be preferably set such that the peak of the connection operation load generated by compressing the first annular sealing member and the peak of the connection operation load generated by compressing the second annular sealing member occur at a certain extent of interval.

Specifically, in the first complex connector structure, the distance in the insertion direction between the connection position in the first connector structure portion and the connection position in the second connector structure portion is preferably equal to or longer than ½, longer than ½, equal to or longer than ⅔, or equal to or longer than ¾ of the length in an axial direction of each of the annular sealing members in a natural state. The reasons are as follows.

The connection operation load in the first complex connector structure increases after connection insertion is started until the body connection portion and the mating connection portion are disposed at the corresponding connection position so that the compression amount in the radial direction of the annular sealing member becomes maximum. Then, this connection operation load decreases.

In a case where typical annular sealing members are used, the compression amount in the radial direction of each of the annular sealing members becomes maximum when the annular sealing member is, at a position corresponding to ½ of the length thereof in the axial direction, brought into contact with the corresponding body connection portion and mating connection portion.

Therefore, by setting the distance in the insertion direction between the connection position in the first connector structure portion and the connection position in the second connector structure portion to be equal to or longer than ½ of the length in the axial direction of the annular sealing member, the peak of the connection operation load generated by compressing the first annular sealing member and the peak of the connection operation load generated by compressing the second annular sealing member are shifted away from each other to a certain extent. Consequently, the connection operation load in the first complex connector structure is further decreased.

In a case where the first complex connector structure satisfies the requirement (a), the above distance in the insertion direction between the connection position in the first connector structure portion and the connection position in the second connector structure portion may be rephrased as the distance in the insertion direction between the first body seal-equipped portion and the second body seal-equipped portion. Likewise, in a case where the first complex connector structure satisfies the requirement (b), the above distance may be rephrased as the distance in the insertion direction between the first mating seal-equipped portion and the second mating seal-equipped portion. Likewise, in a case where the first complex connector structure satisfies the requirement (c), the above distance may be rephrased as the distance in the insertion direction between the front end portion of the first mating connection portion and the front end portion of the second mating connection portion. Likewise, in a case where the first complex connector structure satisfies the requirement (d), the above distance may be rephrased as the distance in the insertion direction between the front end portion of the first body connection portion and the front end portion of the second body connection portion.

The length in the axial direction of each of the annular sealing members is changed by equipping the corresponding body seal-equipped portion therewith or compressing the annular sealing member. Thus, the length in the axial direction of the annular sealing member in a natural state is used as a reference in the present specification.

The first complex connector structure includes a plurality of connector structure portions each including: a body portion; a mating portion; and an annular sealing member. One of the plurality of connector structure portions is the first connector structure portion, and another one of the plurality of connector structure portions is the second connector structure portion.

The first connector structure portion may be only one of, or each of two or more of, the plurality of connector structure portions in the first complex connector structure.

In description from another perspective, the first complex connector structure includes a plurality of the body portions. One of the plurality of body portions is the first body portion, and another one of the plurality of body portions is the second body portion. The first body portion may be only one of, or each of two or more of, the plurality of body portions in the first complex connector structure. The first complex connector structure further includes a plurality of the mating portions. One of the plurality of mating portions is the first mating portion, and another one of the plurality of mating portions is the second mating portion. The first mating portion may be only one of, or each of two or more of, the plurality of mating portions in the first complex connector structure.

In the first complex connector structure, the timing at which the compression amount in the radial direction of the annular sealing member becomes maximum during a connection operation between the body portion and the mating portion differs between the first connector structure portion and the second connector structure portion. Therefore, a connector structure portion that is not the first connector structure portion among the plurality of connector structure portions is considered as the second connector structure portion. Likewise, a body portion that is not the first body portion among the plurality of body portions is considered as the second body portion, and a mating portion that is not the first mating portion among the plurality of mating portions is considered as the second mating portion.

Meanwhile, in order to inhibit an abrupt and excessive increase in a connection operation load in the first complex connector structure, suppression of unevenness in the connection operation load is important.

Considering this importance, in a case where the first complex connector structure has a plurality of the first body portions and/or a plurality of the second body portions, arrangement is preferably made such that body portions adjacent to the first body portions serve as the second body portions. This arrangement is made in consideration of the fact that, in a case where the first body portions are adjacent to each other, the connection operation load is locally increased at the adjacent portions. That is, this arrangement is made to disperse the connection operation load.

In order to further disperse the connection operation load, further arrangement is more preferably made such that body portions adjacent to the second body portions serve as the first body portions.

The first complex connector satisfies the following requirement (e) or (f):
(e) a requirement that
each of the body connection portions has the body seal-equipped portion, and
the body seal-equipped portion of the first body portion and the body seal-equipped portion of the second body portion are located at positions different from each other in the insertion direction; or
(f) a requirement that
none of the body connection portions has the body seal-equipped portion, and
the front end portion of the body connection portion of the first body portion and the front end portion of the body connection portion of the second body portion are located at positions different from each other in the insertion direction.

The above requirement (e) is equivalent to the requirement (a) described above, and a first complex connector satisfying the requirement (e) is also considered as the complex connector of the first complex connector structure satisfying the requirement (a).

The above requirement (f) is equivalent to the requirement (d) described above and is based on the assumption of a mode in which: none of the body connection portions has the body seal-equipped portion; and each of the mating connection portions has the mating seal-equipped portion. A first complex connector satisfying the requirement (f) is also considered as the complex connector of the first complex connector structure satisfying the requirement (d).

The complex connector of the first complex connector structure satisfying the requirement (b) or the requirement (c) is not described here since corresponding structural characteristics are not specified.

In the first complex connector satisfying the requirement (e), the distance in the insertion direction between the first body seal-equipped portion and the second body seal-equipped portion is preferably equal to or longer than ½, longer than ½, equal to or longer than ⅔, or equal to or longer than ¾ of the length in the axial direction of each of the annular sealing members in a natural state in the same manner as in the complex connector of the first complex connector structure satisfying the requirement (a).

Likewise, in the first complex connector satisfying the requirement (f), the distance in the insertion direction between the front end portion of the first body connection portion and the front end portion of the second body connection portion is preferably equal to or longer than ½, longer than ½, equal to or longer than ⅔, or equal to or longer than ¾ of the length in the axial direction of each of the annular sealing members in a natural state in the same manner as in the complex connector of the first complex connector structure satisfying the requirement (d).

Furthermore, in the first complex connector, a body portion adjacent to the first body portion is preferably the second body portion, and in addition, a body portion adjacent to the second body portion is preferably the first body portion, in the same manner as in the complex connector of the first complex connector structure.

[2] Second Complex Connector and Second Complex Connector Structure

The second complex connector structure includes a plurality of body portions, a plurality of mating portions, and a plurality of annular sealing members such that the body portions, the mating portions, and the annular sealing members correspond to one another. The inside of the second complex connector structure, i.e., the inside of each of the body portions and the inside of the mating portion connected to the body portion, is demarcated from the outside and sealed by the corresponding annular sealing member.

In the second complex connector structure, the plurality of body portions are integrated with each other, and the plurality of mating portions are also integrated with each other.

That is, in the second complex connector structure, the positions of the body portions are hardly changed relative to each other, and the positions of the mating portions are also hardly changed relative to each other.

In the second complex connector structure, each of the body portions has a body connection portion, and each of the mating portions has a mating connection portion connected to the corresponding body connection portion. The body connection portion has: a front-side divisional part having a tubular shape and located on a front side in a relative insertion direction for the mating connection portion; a rear-side divisional part having a tubular shape and located on a rear (i.e., opposite) side in the relative insertion direction for the mating connection portion; and a body assembling portion integrating the front-side divisional part and the rear-side divisional part with each other. The body connection portion is also considered to be divided into the front-side divisional part and the rear-side divisional part which are integrated with each other by the body assembling portion.

In the second complex connector structure, the body assembling portion restricts change in the relative position between the front-side divisional part and the rear-side divisional part in an axial direction of the body connection portion. Consequently, the front-side divisional part and the rear-side divisional part are integrated with each other with high reliability, and hence, the shape of the body portion is maintained with high reliability.

Meanwhile, this body assembling portion allows change in the relative position between the front-side divisional part and the rear-side divisional part in a radial direction of the body connection portion. That is, in the second complex connector structure, during a connection operation between each of the body portions and the corresponding mating portion, the positions of the front-side divisional part and the rear-side divisional part belonging to the same body connection portion are enabled to be changed relative to each other in the radial direction of this body connection portion.

In the second complex connector structure, the positions of the front-side divisional part and the rear-side divisional part are changed relative to each other in the radial direction of each of the body connection portions during a connection operation, to allow displacement of the relative position between the plurality of body portions, displacement of the relative position between the plurality of mating portions, and displacement of the relative position between each of the body portions and the corresponding mating portion. Consequently, the second complex connector structure enables a connection operation between each of the body portions and the corresponding mating portion to be performed while allowing displacement of the relative positions between the portions.

Hereinafter, the second complex connector and the second complex connector structure will be described in relation to each constituent thereof.

The second complex connector structure includes a plurality of body portions, a plurality of mating portions, and a plurality of annular sealing members.

Among these constituents, each of the body portions has a body connection portion having a tubular shape, and, since the body portion has the body connection portion, the body portion has a tubular shape as a whole as well.

Each of the mating portions has a mating connection portion which is inserted into the body connection portion of the corresponding body portion or into which this body connection portion is inserted.

In the second complex connector structure, the condition that the body portion has a tubular shape is a prerequisite, and meanwhile, the mating portion may, or does not have to, have a tubular shape.

A tube inside of the second complex connector structure is formed by at least the inside of the body portion. The tube inside may be used as a flow path for a fluid such as liquid or gas or may be used as a housing that houses an article such as a cable so as to isolate the article from the outside, for example. That is, use of the second complex connector structure is not particularly limited, and the second complex connector structure is suitably used as, for example, a flow path member that forms such a fluid flow path or a housing that houses such an article.

The body portion only has to have a tubular shape as a whole, and the shape and the material thereof are not particularly limited. For example, the body portion may have: a tubular shape having no bottom with both ends thereof in the axial direction being opened; or a tubular shape having a bottom with one or both ends thereof in the axial direction being closed.

Regarding the mating portion as well, the shape and the material thereof are not particularly limited. The mating portion may have a tubular shape and may form the above tube inside together with the body portion.

For example, the mating portion may have a tubular shape having no bottom or may have a tubular shape having a bottom. In a case where the mating portion does not have a tubular shape, this mating portion may be a stopper or the like for isolating the tube inside of the body portion from the outside, for example.

The body connection portion of the body portion particularly suitably has a linear tubular shape in consideration of the fact that: the body connection portion is inserted into the mating connection portion of the mating portion; or this mating connection portion is inserted into the body connection portion.

The mating connection portion also preferably has a linear shape, and, in a case where the body connection portion is inserted into the mating connection portion, this mating connection portion needs to have a tubular shape. The mating connection portion in this case also particularly suitably has a linear tubular shape.

In the case where the body connection portion is inserted into the mating connection portion, the outer diameter of the body connection portion is preferably smaller than the inner diameter of the mating connection portion. Meanwhile, in a case where the mating connection portion is inserted into the body connection portion, the outer diameter of the mating connection portion is preferably smaller than the inner diameter of the body connection portion.

Hereinafter, similar to the first complex connector structure described above, the following references are made as necessary also in the second complex connector structure. That is, a portion of the body portion other than the body connection portion is referred to as body general portion, and a portion of the mating portion other than the mating connection portion is referred to as mating general portion.

As described above, the body connection portion preferably has a linear tubular shape. Meanwhile, the body general portion may have a linear tubular shape or a curved tubular shape. Alternatively, the body general portion may have a diameter-varying tubular shape (e.g., the shape of a bellows) having, in the radial direction, a length that varies along the axial direction among portions of the body general portion.

Likewise, the mating general portion may also have a linear tubular shape, a curved tubular shape, or a diameter-varying tubular shape such as the shape of a bellows. Still alternatively, the mating general portion does not have to have a tubular shape.

The body portion may be a non-deformable rigid member or a deformable flexible member. The mating portion may also be a rigid member or a flexible member.

The second complex connector structure has a plurality of the body portions and a plurality of the mating portions. The number of the body portions and the number of the mating portions are not particularly limited, but the number of the mating portions is preferably equal to or larger than the number of the body portions in consideration of the fact that each of the body portions has a tubular shape.

In the second complex connector structure, the plurality of body portions are integrated with each other, and the plurality of mating portions are integrated with each other.

Regarding the plurality of body portions among these constituents, the body portions are integrated with each other to form a complex connector.

In the second complex connector structure, neither the method for integrating the body portions nor the method for integrating the mating portions is particularly limited. For example, the method for integrating the body portions may include: connecting and integrating the plurality of separate body portions with each other by using a member separate from the body portions; or integrally molding the plurality of body portions. Likewise, the method for integrating the mating portions may include: connecting and integrating the plurality of separate mating portions with each other by using a member separate from the mating portions; or integrally molding the plurality of mating portions.

The body portions may be integrated with each other such that: the positions thereof are not mutually changed; or said positions are allowed to be mutually changed slightly. The mating portions may also be integrated with each other such that: the positions thereof are not mutually changed; or said positions are allowed to be mutually changed slightly.

With the second complex connector structure having a part at which the plurality of body portions are integrated with each other and a part at which the plurality of mating portions are integrated with each other, each of the parts may have such a high rigidity as to be non-deformable, for example. In this case, the positions of the plurality of body portions are prevented from being changed relative to each other, and the positions of the plurality of mating portions are also prevented from being changed relative to each other. Alternatively, with the second complex connector structure having a part at which the plurality of body portions are integrated with each other and a part at which the plurality of mating portions are integrated with each other, each of the parts may have such a low rigidity, or may be so soft, as to be deformable. In this case, the positions of the plurality of body portions are hardly changed relative to each other but are enabled to be mutually changed slightly, and the positions of the plurality of mating portions are also hardly changed relative to each other but are enabled to be mutually changed slightly.

As described above, the second complex connector structure includes a plurality of connector structure portions each including a body portion and a mating portion. The second complex connector structure having the plurality of body portions and the plurality of mating portions is also considered to include the plurality of connector structure portions.

Meanwhile, in the second complex connector structure, the plurality of body portions are integrated with each other, and the plurality of mating portions are integrated with each other. Therefore, a case in which, when the position of one of the body portions is changed, the position of another one of the body portions is changed accordingly is conceivable, for example. Furthermore, a case in which displacement of the relative position between the body portion and the mating portion in one of the connector structure portions is allowed, and meanwhile, displacement of the relative position between the body portion and the mating portion in another one of the connector structure portions is not allowed, is also conceivable, for example.

However, in the second complex connector structure, the body assembling portion of each of the body connection portions allows change in the relative position between the front-side divisional part and the rear-side divisional part in the radial direction of the body connection portion. That is, the body assembling portion of each of the plurality of connector structure portions independently allows change in the relative position between the front-side divisional part and the rear-side divisional part in the radial direction of the corresponding body connection portion. Therefore, the second complex connector structure eliminates or alleviates the inconvenience that displacement of the relative position between the body portion and the mating portion in one of the connector structure portions is allowed, and meanwhile, displacement of the relative position between the body portion and the mating portion in another one of the connector structure portions is not allowed.

The body assembling portion of only at least one of the connector structure portions has to allow, with independence from the other connector structure portions being achieved, change in the relative position between the front-side divisional part and the rear-side divisional part in the radial direction of the corresponding body connection portion. In addition, the body assembling portions of two adjacent ones of the connector structure portions preferably each allow, with independence between the two connector structure portions being achieved, change in the relative position between the front-side divisional part and the rear-side divisional part in the radial direction of the corresponding body connection portion. Furthermore, the body assembling portions of all the connector structure portions particularly preferably each allow, with independence among all the connector structure portions being achieved, change in the relative position between the front-side divisional part and the rear-side divisional part in the radial direction of the corresponding body connection portion.

Likewise, in the second complex connector structure, the body assembling portion of each of the body connection portions restricts change in the relative position between the front-side divisional part and the rear-side divisional part in the axial direction of the body connection portion.

The body assembling portion of only at least one of the connector structure portions has to restrict, with independence from the other connector structure portions being achieved, change in the relative position between the front-side divisional part and the rear-side divisional part in the axial direction of the corresponding body connection portion. In addition, the body assembling portions of two adjacent ones of the connector structure portions preferably each restrict, with independence between the two connector structure portions being achieved, change in the relative position between the front-side divisional part and the rear-side divisional part in the axial direction of the corresponding body connection portion. Furthermore, the body assembling portions of all the connector structure portions particularly preferably each restrict, with independence among all the connector structure portions being achieved, change in the relative position between the front-side divisional part and the rear-side divisional part in the axial direction of the corresponding body connection portion.

The plurality of body portions may be integrated with each other at any positions. The plurality of mating portions may also be integrated with each other at any positions.

However, in order to position the body connection portions of the plurality of body portions with respect to the corresponding mating connection portions with high reliability, portions on the mating portion side (i.e., the front-side divisional parts) of the body connection portions are preferably integrated with each other. Therefore, the plurality of body portions are preferably integrated with each other at the respective front-side divisional parts.

In the second complex connector structure, each of the body connection portions of the body portions is divided into: the front-side divisional part having a tubular shape and located on the front side in the relative insertion direction for the corresponding mating connection portion; and the rear-side divisional part having a tubular shape and located on the rear side in the relative insertion direction for the mating connection portion. The front-side divisional part and the rear-side divisional part are integrated with each other by the body assembling portion. The front-side divisional part is also considered as a portion on the mating portion side of the body connection portion. The rear-side divisional part is also considered as a portion, on the side opposite to the mating portion, of the body connection portion.

During a connection operation between each of the body portions and the corresponding mating portion, the body connection portion is inserted into the mating connection portion, or the mating connection portion is inserted into the body connection portion. In either of the cases, the body connection portion and the mating connection portion get close to each other during the connection operation. Therefore, the front-side divisional part of the body connection portion is also considered to be located on a front side, relative to the rear-side divisional part, in such a direction as to get close to the mating portion during the connection operation.

Each of the front-side divisional part and the rear-side divisional part only has to have a tubular shape as a whole. The front-side divisional part and the rear-side divisional part only have to form a body connection portion having a tubular shape by being integrated with each other by the body assembling portion.

The body assembling portion only has to integrate the front-side divisional part and the rear-side divisional part with each other, allow change in the relative position between the front-side divisional part and the rear-side divisional part in the radial direction of the body connection portion, and restrict said change in the axial direction of the body connection portion. The shape of the body assembling portion, the mechanism that allows change in the relative position between the front-side divisional part and the rear-side divisional part in the radial direction of the body connection portion, and the mechanism that restricts change in the relative position between the front-side divisional part and the rear-side divisional part in the axial direction of the body connection portion, are not particularly limited as long as these conditions are satisfied.

The body assembling portion may be a part of the front-side divisional part and/or the rear-side divisional part or may be separate from the front-side divisional part and the rear-side divisional part.

For example, the body assembling portion may have: a front-side body assembling portion which is a part of the front-side divisional part and which is located at an end portion on the rear-side divisional part side of the front-side divisional part; and a rear-side body assembling portion which is a part of the rear-side divisional part and which is located at an end portion on the front-side divisional part side of the rear-side divisional part.

In a case where the body assembling portion has the above front-side body assembling portion and rear-side body assembling portion, the following conditions are preferably satisfied.

[x] The front-side body assembling portion has the shape of a groove opened to the rear-side divisional part side and extending in a circumferential direction of the front-side divisional part. Furthermore, the rear-side body assembling portion has the shape of a raised wall protruding to the front-side divisional part side and extending in a circumferential direction of the rear-side divisional part. Moreover, the rear-side body assembling portion is inserted into the groove which is the front-side body assembling portion when the front-side divisional part and the rear-side divisional part are integrated with each other.

In addition, the groove width of the front-side body assembling portion having the shape of the groove is larger than the thickness of the rear-side body assembling portion having the shape of the raised wall.

In the case of satisfying the above conditions [x], the groove width of the front-side body assembling portion having the shape of the groove is larger than the thickness of the rear-side body assembling portion having the shape of the raised wall, whereby change in the relative position between the front-side divisional part and the rear-side divisional part in the radial direction of the body connection portion is allowed also when the front-side divisional part and the rear-side divisional part are integrated with each other.

Also, in the case of satisfying the above conditions [x], the following condition is preferably satisfied.

[x-1] The body assembling portion has a restriction structure that, when the front-side divisional part and the rear-side divisional part are integrated with each other, restricts change in relative position in such a direction that the front-side divisional part and the rear-side divisional part get close to each other, in the axial direction of the body connection portion.

As the restriction structure in the above condition [x-1], for example, the front-side body assembling portion and the rear-side body assembling portion may be used. For example, when the front-side divisional part and the rear-side divisional part are integrated with each other, a protruding end of the rear-side body assembling portion preferably faces a groove bottom of the front-side body assembling portion. With this configuration, when the front-side divisional part and the rear-side divisional part are integrated with each other, excessive approaching between the front-side divisional part and the rear-side divisional part causes the protruding end of the rear-side body assembling portion and the groove bottom of the front-side body assembling portion to come into contact and interfere with each other. Consequently, change in relative position in such a direction that the front-side divisional part and the rear-side divisional part get close to each other is restricted.

Also, in the case of satisfying the above conditions [x], the following condition is preferably satisfied.

[x-2] The body assembling portion has, in addition to the front-side body assembling portion and the rear-side body assembling portion, a restriction structure that, when the front-side divisional part and the rear-side divisional part are integrated with each other, restricts change in relative position in such a direction that the front-side divisional part and the rear-side divisional part move away from each other, in the axial direction of the body connection portion.

As the restriction structure in the above condition [x-2], for example, a front-side engagement portion which is a part of the front-side divisional part and a rear-side engagement portion which is a part of the rear-side divisional part and which is engaged with the front-side engagement portion may be provided to the body assembling portion. In this case, the front-side engagement portion is preferably located at an end portion on the rear-side divisional part side of the front-side divisional part. Meanwhile, the rear-side engagement portion is preferably located at an end portion on the front-side divisional part side of the rear-side divisional part. The front-side engagement portion and the rear-side engagement portion only have to, when the front-side divisional part and the rear-side divisional part are integrated with each other, get close to and be engaged with each other so as to restrict change in relative position in such a direction that the front-side divisional part and the rear-side divisional part move away from each other.

In the case of satisfying the above conditions [x], the body assembling portion may have one of the restriction structure in the condition [x-1] and the restriction structure in the condition [x-2] alone and preferably has both of these restriction structures.

Alternatively, in a case where the body assembling portion has the above front-side body assembling portion and rear-side body assembling portion, the following conditions are preferably satisfied.

[y] The rear-side body assembling portion has the shape of a groove opened to the front-side divisional part side and extending in the circumferential direction of the rear-side divisional part. Furthermore, the front-side body assembling portion has the shape of a raised wall protruding to the rear-side divisional part side and extending in the circumferential direction of the front-side divisional part. Moreover, the front-side body assembling portion is inserted into the groove which is the rear-side body assembling portion when the front-side divisional part and the rear-side divisional part are integrated with each other.

In addition, the groove width of the rear-side body assembling portion having the shape of the groove is larger than the thickness of the front-side body assembling portion having the shape of the raised wall.

In the case of satisfying the above conditions [y], the groove width of the rear-side body assembling portion having the shape of the groove is larger than the thickness of the front-side body assembling portion having the shape of the raised wall, whereby change in the relative position between the front-side divisional part and the rear-side divisional part in the radial direction of the body connection portion is allowed also when the front-side divisional part and the rear-side divisional part are integrated with each other.

Also, in the case of satisfying the above conditions [y], the following condition is preferably satisfied.

[y-1] The body assembling portion has a restriction structure that, when the front-side divisional part and the rear-side divisional part are integrated with each other, restricts change in relative position in such a direction that the front-side divisional part and the rear-side divisional part get close to each other, in the axial direction of the body connection portion.

As the restriction structure in the above condition [y-1], for example, the front-side body assembling portion and the rear-side body assembling portion may be used. In this case, a protruding end of the front-side body assembling portion preferably faces a groove bottom of the rear-side body assembling portion when the front-side divisional part and the rear-side divisional part are integrated with each other. With this configuration, when the front-side divisional part and the rear-side divisional part are integrated with each other, excessive approaching between the front-side divisional part and the rear-side divisional part causes the protruding end of the front-side body assembling portion and the groove bottom of the rear-side body assembling portion to come into contact and interfere with each other. Consequently, change in relative position in such a direction that the front-side divisional part and the rear-side divisional part get close to each other is restricted.

Also, in the case of satisfying the above conditions [y], the following condition is preferably satisfied.

[y-2] The body assembling portion has, in addition to the front-side body assembling portion and the rear-side body assembling portion, a restriction structure that, when the front-side divisional part and the rear-side divisional part are integrated with each other, restricts change in relative position in such a direction that the front-side divisional part and the rear-side divisional part move away from each other, in the axial direction of the body connection portion.

As the restriction structure in the above condition [y-2], for example, a front-side engagement portion which is a part of the front-side divisional part and a rear-side engagement portion which is a part of the rear-side divisional part and which is engaged with the front-side engagement portion may be provided to the body assembling portion. In this case, the front-side engagement portion is preferably located at an end portion on the rear-side divisional part side of the front-side divisional part. Meanwhile, the rear-side engagement portion is preferably located at an end portion on the front-side divisional part side of the rear-side divisional part. The front-side engagement portion and the rear-side engagement portion only have to, when the front-side divisional part and the rear-side divisional part are integrated with each other, get close to and be engaged with each other so as to restrict change in relative position in such a direction that the front-side divisional part and the rear-side divisional part move away from each other.

In the case of satisfying the above conditions [y] as well, the body assembling portion may have one of the restriction structure in the condition [y-1] and the restriction structure in the condition [y-2] alone and preferably has both of these restriction structures.

In the second complex connector structure, the above body general portion may be composed of one member or may be obtained by assembling and integrating two or more multiple members. Likewise, each of the mating connection portion and the mating general portion may also be composed of one member or may also be obtained by assembling and integrating two or more multiple members.

Each of the annular sealing members is interposed between the body connection portion of the corresponding body portion and the mating connection portion of the mating portion connected to this body portion in a state where the annular sealing member is compressed in the radial direction thereof during connection. Hereinafter, as necessary, a combination of one body portion, one mating portion connected to the body portion, and one annular sealing member interposed between the body portion and the mating portion is sometimes referred to as connector structure portion. The second complex connector structure includes a plurality of the connector structure portions.

During connection, the body connection portion, the mating connection portion, and the annular sealing member in each of the connector structure portions are arranged in the order of the body connection portion, the annular sealing member, and the mating connection portion in the thickness direction of the connector structure portion. The annular sealing member is located at the position between the body connection portion and the mating connection portion in a state where the annular sealing member is compressed in the radial direction thereof, i.e., the thickness direction of the connector structure portion. Thus, the interval between the body connection portion and the mating connection portion is sealed at this position.

Such an annular sealing member only has to be formed from an elastic material and have an annular shape, and the material, the size, and the like thereof are not particularly limited. Basically, a material for the annular sealing member is preferably selected according to use of the body portion and the mating portion.

For example, in a case where a fluid such as gas or liquid flows through the tube inside, a material that hardly reacts with the fluid and that inhibits the fluid from passing through the annular sealing member and leaking to the outside is preferably selected according to the type of the fluid.

The annular sealing member needs to have a shape that enables the annular sealing member to be compressed between the body connection portion and the mating connection portion during connection between the body portion and the mating portion. In consideration of the necessity of sealing the interval between the body connection portion and the mating connection portion with high sealability, a material having excellent elastic restoring force is preferably selected as a material for the annular sealing member.

In the second complex connector structure, the body portion and the mating portion are connected by the body connection portion and the mating connection portion, and the front-side divisional part and the rear-side divisional part included in the body connection portion are integrated with each other by the body assembling portion. Therefore, the interval between the front-side divisional part and the rear-side divisional part is also preferably sealed.

Specifically, in the second complex connector structure, while the annular sealing member is interposed between the body connection portion and the mating connection portion, the same annular sealing member is preferably interposed also between the front-side divisional part and the rear-side divisional part.

The annular sealing member interposed between the body connection portion and the mating connection portion, and the annular sealing member interposed between the front-side divisional part and the rear-side divisional part, may differ from each other but are preferably the same as each other in order to decrease the number of components of the second complex connector structure.

In other words, in the second complex connector structure as well, the annular sealing member is preferably interposed between the front-side divisional part and the rear-side divisional part and between the body connection portion and the mating connection portion in the same manner as in the first complex connector structure.

In the second complex connector structure as well, the annular sealing member in the complex connector structure is, when the body portion and the mating portion are connected, disposed between the body connection portion and the mating connection portion in a state where the annular sealing member is compressed in the radial direction thereof, in the same manner as in the first complex connector structure described above. Therefore, in the second complex connector structure as well, a connection operation load applied during connection between the body portion and the mating portion is mainly related to compression of the annular sealing member, and thus there is a concern that increase in the number of the annular sealing members leads to excessive increase in the connection operation load.

Considering this concern, in the second complex connector structure as well, the timing at which the compression amount in the radial direction of the annular sealing member becomes maximum during a connection operation between the body portion and the mating portion is preferably set to differ between the first connector structure portion which is one of the connector structure portions and the second connector structure portion which is another one of the connector structure portions, in the same manner as in the first complex connector structure.

In other words, similar to the first complex connector structure, the second complex connector structure may be a sequential-insertion-type complex connector structure.

Consequently, the connection operation load in the second complex connector structure is mitigated, and hence, a connection operation between each of the body portions and the corresponding mating portion is easily performed.

In the second complex connector structure as well, the method for causing the timing, at which the compression amount in the radial direction of the annular sealing member becomes maximum, to differ between the first connector structure portion and the second connector structure portion is the same as the method in the first complex connector structure.

Hereinafter, the first complex connector, the first complex connector structure, the second complex connector, and the second complex connector structure of the present disclosure will be described by means of specific examples.

Example 1

A complex connector structure of Example 1 satisfies the requirement (a) among the requirements of the first complex connector structure of the present disclosure. A complex connector of Example 1 satisfies the requirement (e) out of the requirements of the first complex connector of the present disclosure.

Figure 2:
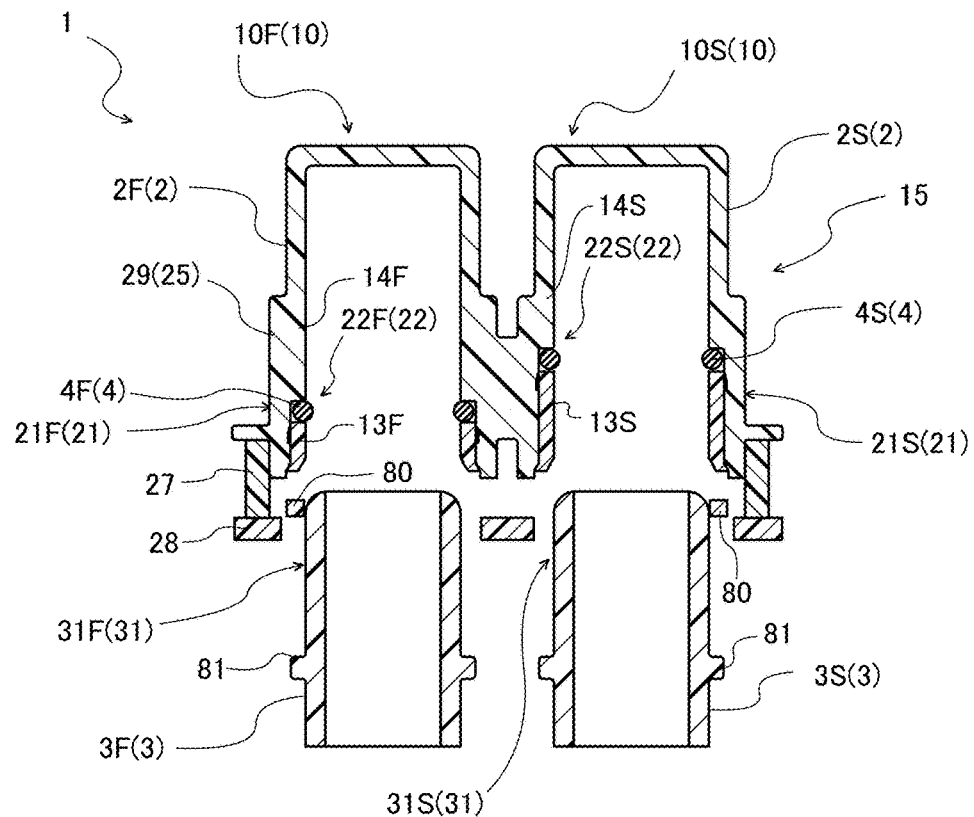
FIG. 2 is a diagram for schematically explaining the complex connector structure of Example 1 during a connection operation.
Figure 4:
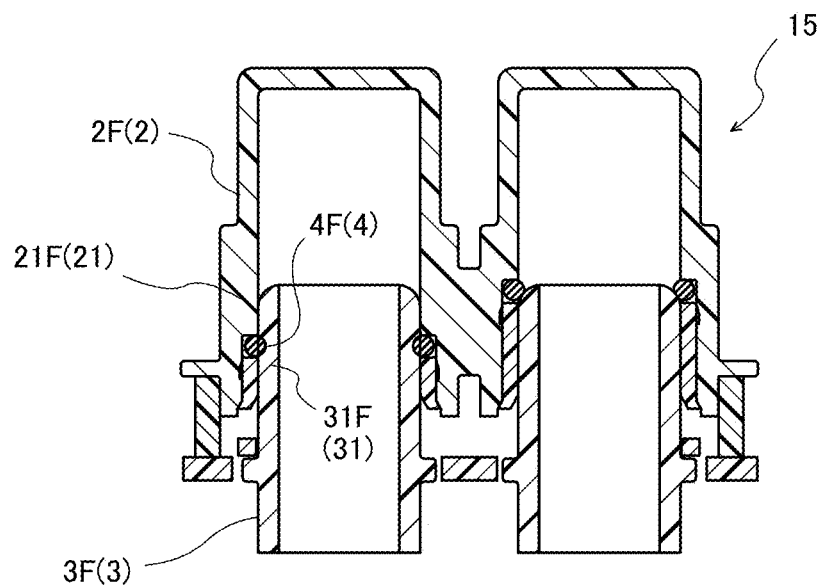
FIG. 4 is a diagram for schematically explaining the complex connector structure of Example 1 during the connection operation.
Figure 5:
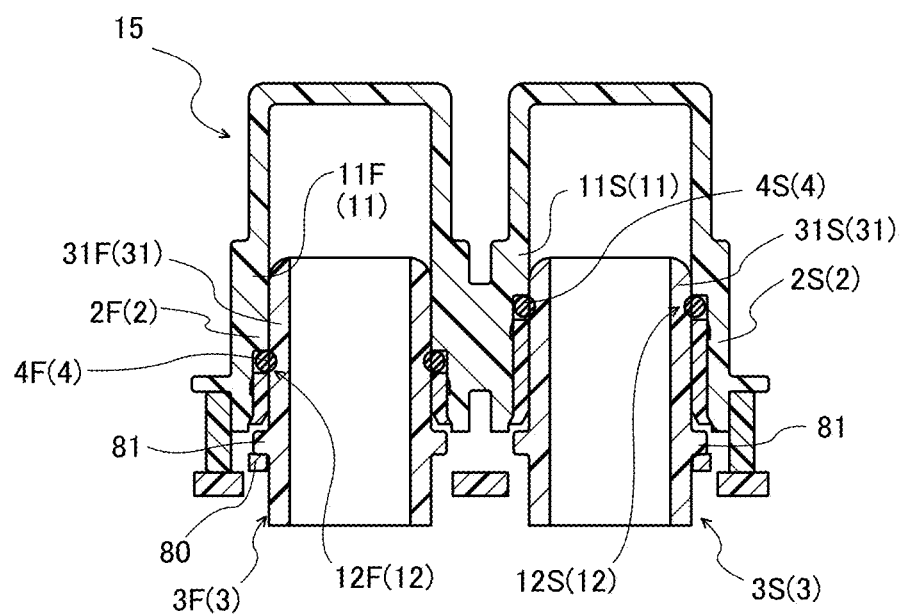
FIG. 5 is a diagram for schematically explaining the complex connector structure of Example 1 during the connection operation.

FIG. 1 is a diagram for schematically explaining a situation in which the complex connector of the complex connector structure of Example 1 has been disassembled. FIG. 2, FIG. 4, and FIG. 5 are each a diagram for schematically explaining the complex connector structure of Example 1 during a connection operation.

Figure 3:
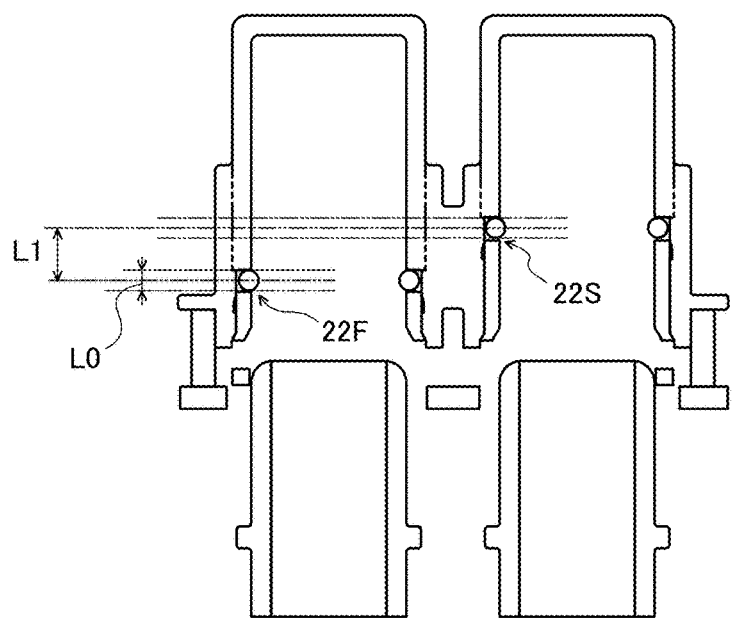
FIG. 3 is a diagram for schematically explaining the distance in an insertion direction between a first body seal-equipped portion and a second body seal-equipped portion.

FIG. 3 is a diagram for schematically explaining the distance in the insertion direction between the first body seal-equipped portion and the second body seal-equipped portion.

FIG. 2 shows a state where, during the connection operation, the first body portion and the first mating portion have yet to be connected, and the second body portion and the second mating portion also have yet to be connected. FIG. 4 shows a state where, during the connection operation, the first body portion and the first mating portion are connected, and the second body portion and the second mating portion have yet to be connected. FIG. 5 shows a state where, during the connection operation, the first body portion and the first mating portion are connected, and the second body portion and the second mating portion are connected.

As shown in FIG. 2, the complex connector structure 1 of Example 1 includes two connector structure portions 10 each including: a body portion 2; a mating portion 3; and an annular sealing member 4. One of the connector structure portions 10 is referred to as first connector structure portion 10F, and the other one is referred to as second connector structure portion 10S.

As shown in FIG. 2 to FIG. 5, each of the body portions 2 and the corresponding mating portion 3 in the complex connector structure 1 of Example 1 are connected by inserting the mating portion 3 into the body portion 2 in the axial direction of the body portion 2.

As shown in FIG. 1, the body portion 2 in each of the connector structure portions 10 is in the form of a substantially L-shaped cylinder. A portion on one end side of the body portion 2 is a body connection portion 21 into which the corresponding mating portion 3 is inserted. A portion on the other end side of the body portion 2 is a hose joint connected to a hose (not shown) which is another mating portion.

The body connection portion 21 has a body seal-equipped portion 22 on one end side thereof. The body seal-equipped portion 22 is an annular groove opened on the inner circumferential surface of the body portion 2.

More specifically, a first body portion 2F which is the body portion 2 of the first connector structure portion 10F and a second body portion 2S which is the body portion 2 of the second connector structure portion 10S have substantially cylindrical shapes and are arranged such that the axial directions thereof are parallel to each other. The first body portion 2F and the second body portion 2S are adjacent to each other. The first body portion 2F and the second body portion 2S are, from the radially outer sides thereof, integrated with each other by a coupling portion 25. Consequently, the first body portion 2F and the second body portion 2S form a complex connector 15.

A first bush 13F which is a portion on the front side (i.e., the mating portion 3 side) of the first body portion 2F has a short tubular shape and is separate from a first base portion 14F which is the remainder of the first body portion 2F. The first bush 13F and the first base portion 14F are arranged in the axial direction of the body portion 2. A gap in the axial direction of the body portion 2 is formed between the first bush 13F and the first base portion 14F.

The gap extends over the entire circumference in the circumferential direction of the first body portion 2F and forms an annular groove. On the radially inner side, the gap is in communication with the tube inside of the first body portion 2F, and meanwhile, on the radially outer side, the gap is covered with the coupling portion 25. The gap corresponds to the body seal-equipped portion 22 of the first body portion 2F, i.e., a first body seal-equipped portion 22F.

The second body portion 2S has: a second bush 13S having a larger length in the axial direction than the first bush 13F; and a second base portion 14S which is the remainder of the second body portion 2S.

The position of a second body seal-equipped portion 22S, i.e., the body seal-equipped portion 22 of the second body portion 2S, differs from the position of the first body seal-equipped portion 22F in the axial direction of each of the body portions 2, i.e., the insertion direction for each of the body portions 2 and the corresponding mating portion 3. More specifically, the first body seal-equipped portion 22F is located on the front side (i.e., the mating portion 3 side) of the body portion 2 relative to the second body seal-equipped portion 22S. Except for this difference, the second body portion 2S is substantially the same as the first body portion 2F.

As shown in FIG. 1 and FIG. 2, the coupling portion 25 has: a coupling base portion 29 and a second coupling equipping portion 28 molded to be integrated with the first body portion 2F and the second body portion 2S; and a first coupling equipping portion 27 which is substantially frame-shaped and with which the coupling base portion 29 and the second coupling equipping portion 28 are equipped. The coupling base portion 29 and the second coupling equipping portion 28 are directly or indirectly equipped with the first coupling equipping portion 27 which is disposed on the mating portion 3 side relative to the first body seal-equipped portion 22F and the second body seal-equipped portion 22S.

The first coupling equipping portion 27 functions as a fixation tool for fixing a first mating connection portion 31F into the first base portion 14F of the first body portion 2F and fixing a second mating connection portion 31S into the second base portion 14S of the second body portion 2S.

The second coupling equipping portion 28 has two body-side locking portions 80 each having the shape of a claw. One of the two body-side locking portions 80 protrudes, on the mating portion 3 side relative to the first body seal-equipped portion 22F, toward the radially inner side of the first body portion 2F. The other one of the two body-side locking portions 80 protrudes toward the radially inner side of the second body portion 2S.

As shown in FIG. 2, a first mating portion 3F belonging to the first connector structure portion 10F is inserted into the first body portion 2F belonging to the first connector structure portion 10F. A second mating portion 3S belonging to the second connector structure portion 10S is inserted into the second body portion 2S belonging to the second connector structure portion 10S.

The first mating portion 3F has substantially the same shape which is the shape of a linear cylinder.

A portion on the front side (i.e., the first body portion 2F side) of the first mating portion 3F is chamfered, and a portion on the rear side (i.e., the side opposite to the first body portion 2F) of the first mating portion 3F is provided with a mating-side locking portion 81 protruding radially outward from the outer circumferential surface of the first mating portion 3F. During connection shown in FIG. 5, each of the mating-side locking portions 81 and the corresponding body-side locking portion 80 are engaged with each other, whereby the body portions 2 and the mating portion 3 are locked in the connected state.

The first mating portion 3F has a part located on the front side relative to the mating-side locking portion 81, and this part is a mating connection portion 31 (first mating connection portion 31F).

The second mating portion 3S has substantially the same shape as the shape of the first mating portion 3F and has a mating-side locking portion 81 and a mating connection portion 31 (second mating connection portion 31S) which are the same as those of the first mating portion 3F.

Each of the first body seal-equipped portion 22F and the second body seal-equipped portion 22S is equipped with one annular sealing member 4.

Each of the annular sealing members 4 is a so-called O-ring formed of nitrile rubber and having an annular shape. The annular sealing member 4 has: a majority portion present in the corresponding body seal-equipped portion 22; and another portion exposed from this body seal-equipped portion 22 to the tube inside of the body portion 2.

The inner diameter of each of the annular sealing members 4 is slightly smaller than the outer diameter of the corresponding mating connection portion 31, and the outer diameter of the annular sealing member 4 is slightly larger than the inner diameter of the corresponding body connection portion 21.

As shown in FIG. 3, the distance in the insertion direction between the first body seal-equipped portion 22F and the second body seal-equipped portion 22S is about 5/2 of a length L0 in the axial direction of each of the annular sealing members 4 in a natural state.

In the present specification, the distance L1 in the insertion direction between the first body seal-equipped portion 22F and the second body seal-equipped portion 22S means, as shown in FIG. 3, the distance in the insertion direction between the center of the first body seal-equipped portion 22F in the insertion direction and the center of the second body seal-equipped portion 22S in the same insertion direction. The insertion direction is identical to the axial directions of the body connection portions 21 and the mating connection portions 31.

In the complex connector structure 1 of Example 1, the complex connector 15 is attached to a drive device (not shown). The position of the complex connector 15 attached to the drive device is changed in the insertion direction toward the mating portions 3 in a fixed state, whereby each of the body portions 2 and the corresponding mating portion 3 are connected.

During a connection operation of connecting each of the body portions 2 and the corresponding mating portion 3, the complex connector 15 is disposed first as shown in FIG. 2 such that: a first body connection portion 21F of the first body portion 2F faces the first mating connection portion 31F of the first mating portion 3F; and a second body connection portion 21S of the second body portion 2S faces the second mating connection portion 31S of the second mating portion 3S.

At this time, the first body portion 2F and the first mating portion 3F have yet to be connected, and the second body portion 2S and the second mating portion 3S also have yet to be connected.

The position of the complex connector 15 is changed in the insertion direction toward the mating portions 3 by the drive device (not shown), to insert the mating connection portions 31 into the body connection portions 21.

As described above, the first body seal-equipped portion 22F is located on the front side (i.e., the mating portion 3 side) relative to the second body seal-equipped portion 22S, and thus the first annular sealing member 4F with which the first body seal-equipped portion 22F is equipped is located on the front side relative to the second annular sealing member 4S with which the second body seal-equipped portion 22S is equipped (see FIG. 2).

The first annular sealing member 4F and the second annular sealing member 4S are compressed in the radial direction during the connection operation, and the compression amounts thereof in the radial direction each become maximum during the connection. Therefore, each of the position of the first annular sealing member 4F and the position of the first body seal-equipped portion 22F equipped with the first annular sealing member 4F is substantially a position for connection between the first body connection portion 21F and the first mating connection portion 31F. Likewise, each of the position of the second annular sealing member 4S and the position of the second body seal-equipped portion 22S equipped with the second annular sealing member 4S is substantially a position for connection between the second body connection portion 21S and the second mating connection portion 31S.

Therefore, the position for connection between the first body connection portion 21F and the first mating connection portion 31F is considered to be on the front side (i.e., the mating portion 3 side) relative to the position for connection between the second body connection portion 21S and the second mating connection portion 31S.

During a connection operation, the first body portion 2F and the first mating portion 3F are connected first as shown in FIG. 4, whereby the compression amount in the radial direction of the first annular sealing member 4F interposed between the first body connection portion 21F and the first mating connection portion 31F becomes maximum. Then, the connection operation is further continued in the state where the first body portion 2F and the first mating portion 3F are connected. Consequently, the second body portion 2S and the second mating portion 3S are connected as shown in FIG. 5, whereby the compression amount in the radial direction of the second annular sealing member 4S interposed between the second body connection portion 21S and the second mating connection portion 31S becomes maximum.

As shown in FIG. 5, when the first body portion 2F and the first mating portion 3F are connected and the second body portion 2S and the second mating portion 3S are connected, each of the body-side locking portions 80 is moved over the corresponding mating-side locking portion 81, whereby the mating-side locking portion 81 and the body-side locking portion 80 are engaged with each other. Consequently, the body portions 2 and the mating portions 3 are locked in the connected state.

The complex connector structure 1 of Example 1 has a complex connector 15 in which the first body portion 2F and the second body portion 2S are integrated with each other. However, the first body seal-equipped portion 22F and the second body seal-equipped portion 22S are located at positions different from each other in the insertion direction, and hence, the position for connection between the first body connection portion 21F and the first mating connection portion 31F and the position for connection between the second body connection portion 21S and the second mating connection portion 31S differ from each other in the insertion direction.

In such a complex connector structure 1 of Example 1, the first annular sealing member 4F and the second annular sealing member 4S are compressed at different timings during the connection operation, whereby a peak of a connection operation load generated by compressing the first annular sealing member 4F and a peak of a connection operation load generated by compressing the second annular sealing member 4S are temporally shifted from each other. Consequently, a connection operation load at which each of the body portions 2 and the corresponding mating portion 3 are connected is, as a whole, prevented from abruptly and significantly increasing in the complex connector structure 1 of Example 1.

As a result, the complex connector structure 1 of Example 1 enables a connection operation between each of the body portions 2 and the corresponding mating portion 3 to be easily performed even though: the complex connector structure 1 has a complex connector 15; and the connection operation between the body portion 2 and the mating portion 3 is performed through a single operation.

Comparative Example

A complex connector structure of a Comparative Example is substantially the same as the complex connector structure of Example 1, except that the connection position in the first connector structure portion and the connection position in the second connector structure portion during a connection operation between each of the body portions and the corresponding mating portion are the same as each other in the insertion direction.

Figure 6:
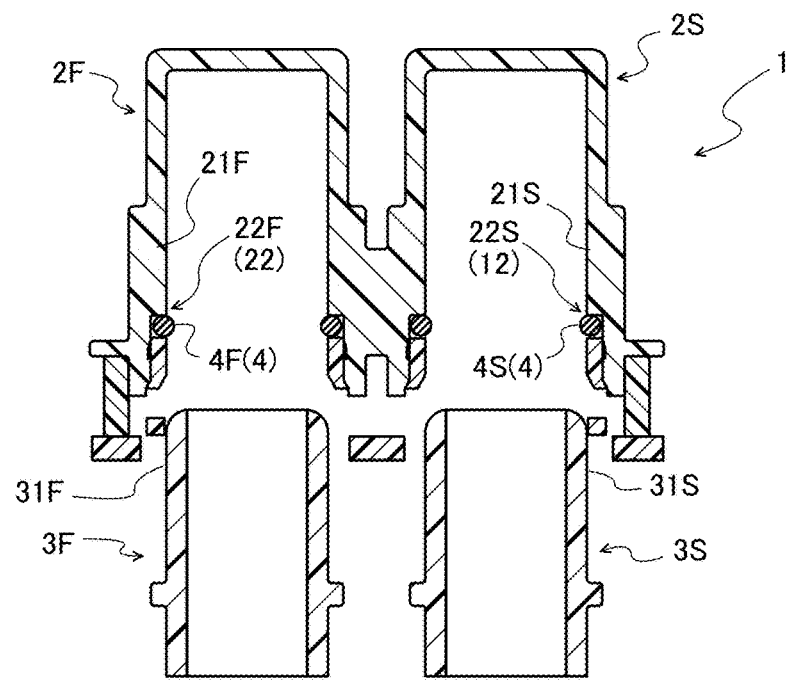
FIG. 6 is a diagram for schematically explaining a complex connector structure of a Comparative Example during a connection operation.
Figure 7:
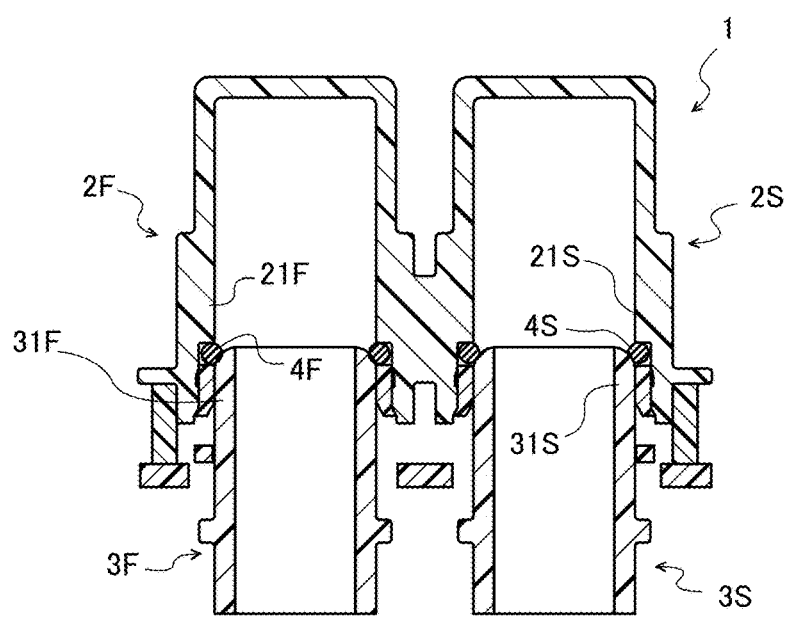
FIG. 7 is a diagram for schematically explaining the complex connector structure of the Comparative Example during the connection operation.
Figure 8:
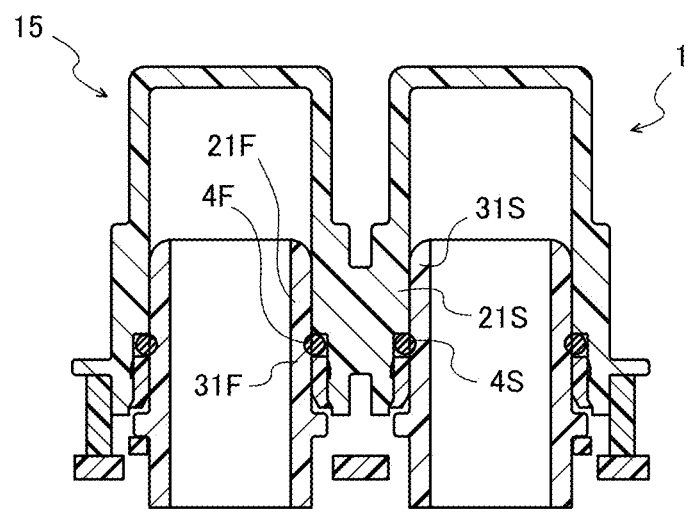
FIG. 8 is a diagram for schematically explaining the complex connector structure of the Comparative Example during the connection operation.

FIG. 6 to FIG. 8 are each a diagram for schematically explaining the complex connector structure of the Comparative Example during a connection operation.

FIG. 6 shows a state where, during the connection operation, the first body portion and the first mating portion have yet to be connected, and the second body portion and the second mating portion have yet to be connected. FIG. 7 shows a state where, during the connection operation, the first body portion and the first mating portion are just about to be connected, and the second body portion and the second mating portion are just about to be connected. FIG. 8 shows a state where, during the connection operation, the first body portion and the first mating portion are connected, and the second body portion and the second mating portion are connected.

Hereinafter, the complex connector structure of the Comparative Example will be described with focus being placed on the difference from the complex connector structure of Example 1.

In the complex connector structure 1 of the Comparative Example, the first body connection portion 21F and the second body connection portion 21S have the respective body seal-equipped portions 22 (the first body seal-equipped portion 22F and the second body seal-equipped portion 22S), and the first body seal-equipped portion 22F and the second body seal-equipped portion 22S are equipped with the respective annular sealing members 4 (the first annular sealing member 4F and the second annular sealing member 4S). Therefore, the first body seal-equipped portion 22F and the second body seal-equipped portion 22S are located at the same position in the insertion direction. Meanwhile, the first mating portion 3F and the second mating portion 3S have shapes identical to each other.

Consequently, in the complex connector structure 1 of the Comparative Example, the position for connection between the first body connection portion 21F and the first mating connection portion 31F and the position for connection between the second body connection portion 21S and the second mating connection portion 31S are the same as each other in the insertion direction.

Thus, during the connection operation, the second body portion 2S and the second mating portion 3S are connected simultaneously with the connection between the first body portion 2F and the first mating portion 3F as shown in FIG. 7 and FIG. 8. Consequently, when the compression amount in the radial direction of the first annular sealing member 4F interposed between the first body connection portion 21F and the first mating connection portion 31F becomes maximum, the compression amount in the radial direction of the second annular sealing member 4S interposed between the second body connection portion 21S and the second mating connection portion 31S becomes maximum simultaneously.

Therefore, in the complex connector structure 1 of the Comparative Example, the peak of the connection operation load generated by compressing the first annular sealing member 4F and the peak of the connection operation load generated by compressing the second annular sealing member 4S are considered to coincide with each other, and the connection operation load is considered to, as a whole, increase abruptly and significantly.

(Evaluation Test)

Changes in the connection operation loads during the connection operations for the complex connector structure 1 of Example 1 and the complex connector structure 1 of the Comparative Example were evaluated. The connection operation for the complex connector structure 1 of Example 1 and the connection operation for the complex connector structure 1 of the Comparative Example were performed under the same condition by using the same drive device, and a position change amount of the complex connector 15 in each of the complex connector structures 1 toward the mating portions 3 and a connection operation load generated according to the change in the position of the complex connector 15 were measured. The results are shown in FIG. 9.

Figure 9:
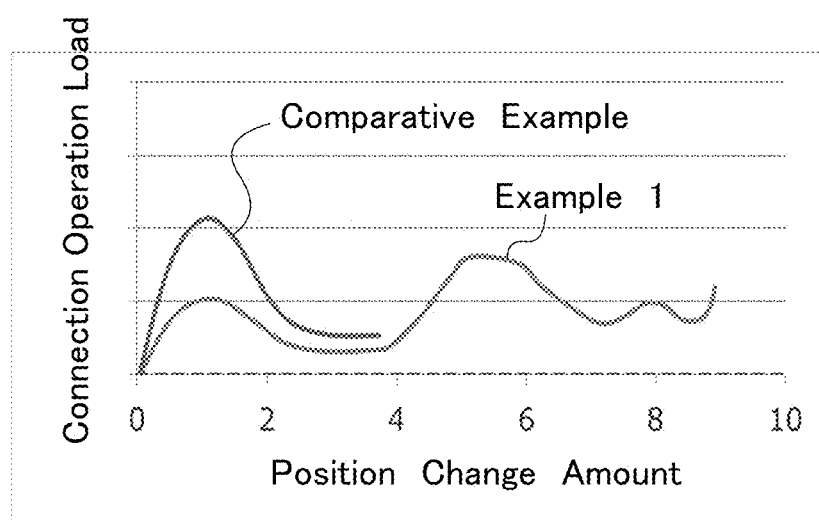
FIG. 9 is a graph indicating results of evaluation tests.

The horizontal axis in FIG. 9 indicates the position change amount of the complex connector 15 in each of the complex connector structures 1 toward the mating portions 3. The vertical axis in FIG. 9 indicates the connection operation load generated according to the change in the position of the complex connector 15.

In the complex connector structure 1 of the Comparative Example, the first body portion 2F and the first mating portion 3F were connected, and the second body portion 2S and the second mating portion 3S were connected, at around a position change amount of 1 in FIG. 9. Thus, the connection operation load rapidly increased to take a large value at this time.

Meanwhile, in the complex connector structure 1 of Example 1, the first body portion 2F and the first mating portion 3F were connected first at around the position change amount of 1 in FIG. 9, and then the second body portion 2S and the second mating portion 3S were connected at around a position change amount of 5 in FIG. 9. Thus, the connection operation load generated in the complex connector structure 1 of Example 1 at around the position change amount of 1 in FIG. 9 had a sufficiently small value smaller than ½ of the connection operation load generated in the complex connector structure 1 of the Comparative Example at around the position change amount of 1 in FIG. 9.

In the complex connector structure 1 of Example 1, the connection operation load increased again at around the position change amount of 5 in FIG. 9. However, the connection operation load at this time also had a sufficiently smaller value than the connection operation load generated in the complex connector structure 1 of the Comparative Example at around the position change amount of 1 in FIG. 9.

These results support the idea that abrupt and significant increase in the connection operation load is inhibited with the complex connector structure 1 of Example 1 in which the first body seal-equipped portion 22F and the second body seal-equipped portion 22S are located at positions different from each other in the insertion direction. In other words, these results support the idea that abrupt and significant increase in the connection operation load is inhibited with the first complex connector structure 1 in which: the position for connection between the first body connection portion 21F and the first mating connection portion 31F and the position for connection between the second body connection portion 21S and the second mating connection portion 31S differ from each other in the insertion direction; and the timing at which the compression amount in the radial direction of the annular sealing member 4 becomes maximum during a connection operation between the body portion 2 and the mating portion 3 differs between the first connector structure portion 10F and the second connector structure portion 10S.

Example 2

A complex connector structure of Example 2 satisfies the requirement (b) among the requirements of the first complex connector structure of the present disclosure.

The complex connector structure of Example 2 is substantially the same as the complex connector structure of Example 1, except that: the first body portion and the second body portion have substantially the same shape; the mating connection portion of each of the mating portions has a mating seal-equipped portion; and the first mating seal-equipped portion and the second mating seal-equipped portion are located at positions different from each other in the insertion direction.

Figure 10:
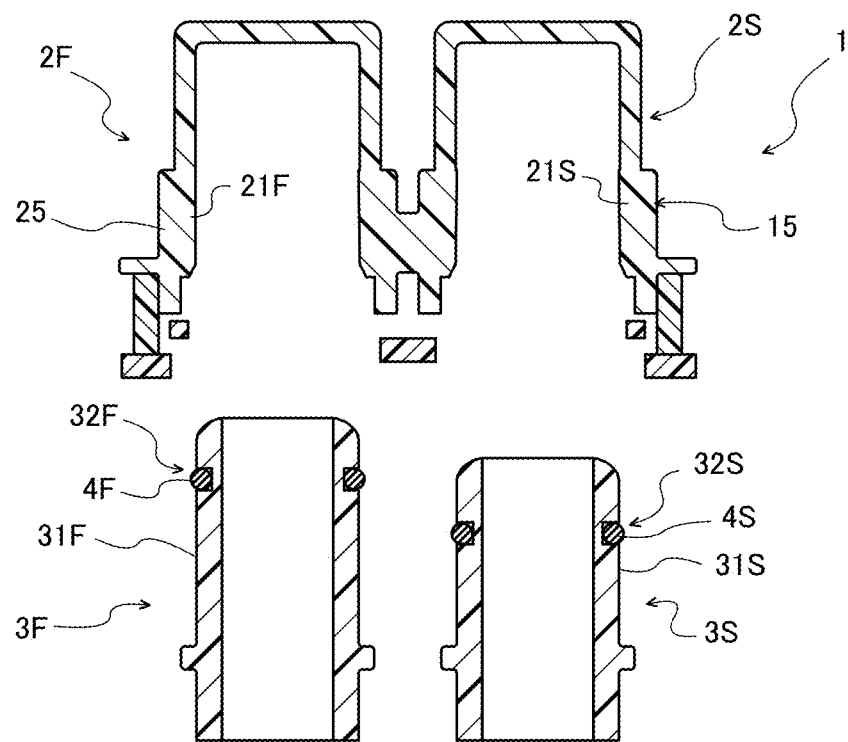
FIG. 10 is a diagram for schematically explaining a complex connector structure of Example 2 during a connection operation.
Figure 11:
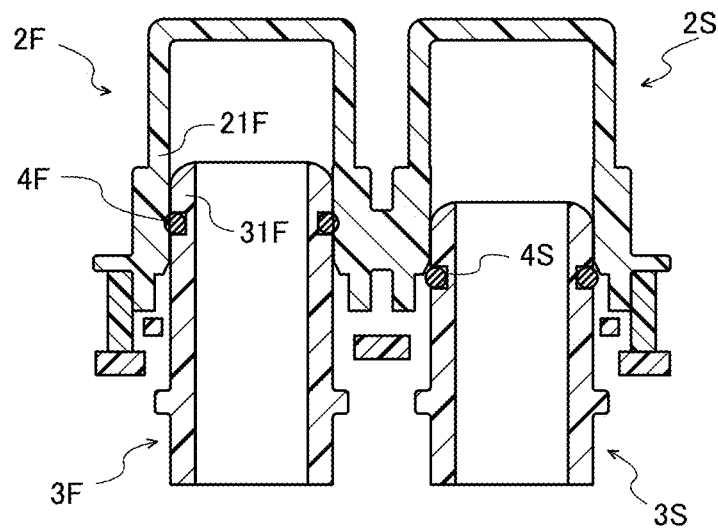
FIG. 11 is a diagram for schematically explaining the complex connector structure of Example 2 during the connection operation.
Figure 12:
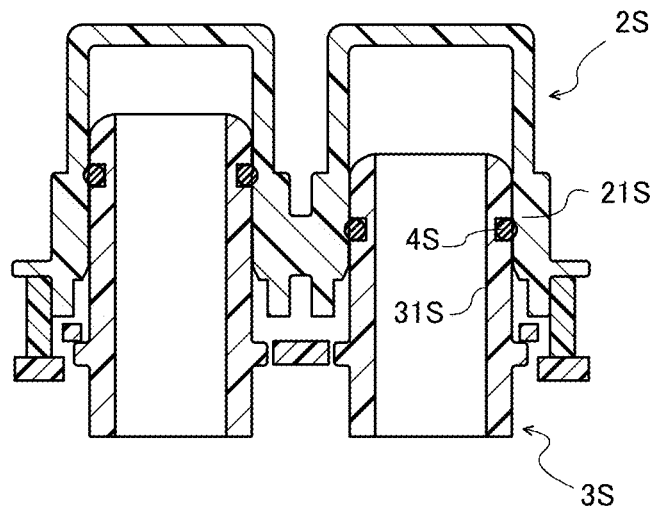
FIG. 12 is a diagram for schematically explaining the complex connector structure of Example 2 during the connection operation.

FIG. 10 to FIG. 12 are each a diagram for schematically explaining the complex connector structure of Example 2 during a connection operation.

FIG. 10 shows a state where, during the connection operation, the first body portion and the first mating portion have yet to be connected, and the second body portion and the second mating portion have yet to be connected. FIG. 11 shows a state where, during the connection operation, the first body portion and the first mating portion are connected, and the second body portion and the second mating portion have yet to be connected. FIG. 12 shows a state where, during the connection operation, the first body portion and the first mating portion are connected, and the second body portion and the second mating portion are connected.

Hereinafter, the complex connector structure of Example 2 will be described with focus being placed on the differences from the complex connector structure of Example 1.

As shown in FIG. 10 to FIG. 12, in the complex connector structure 1 of Example 2, the first body portion 2F and the second body portion 2S having the same shape are arranged to be parallel to each other and are integrated with each other by the coupling portion 25, to form a complex connector 15.

Each of the first mating portion 3F and the second mating portion 3S has the shape of a linear cylinder. The length in the axial direction (i.e., insertion direction) of the first mating connection portion 31F of the first mating portion 3F is slightly longer than the length in the axial direction (i.e., insertion direction) of the second mating connection portion 31S of the second mating portion 3S.

A front-side portion of the first mating connection portion 31F is, over the entire circumference in the circumferential direction of this mating connection portion 31, provided with an annular groove opened to the radially outer side of this mating connection portion 31. The annular groove is a first mating seal-equipped portion 32F in the complex connector structure 1 of Example 2. A front-side portion of the second mating connection portion 31S is also provided with a second mating seal-equipped portion 32S similar to the first mating seal-equipped portion 32F.

The first mating portion 3F and the second mating portion 3S are aligned with each other at the respective rear-side portions thereof, and the front-side portion of the first mating portion 3F is located on the front side relative to the front-side portion of the second mating portion 3S. In the complex connector structure 1 of Example 2, the first mating seal-equipped portion 32F and the second mating seal-equipped portion 32S are located at positions different from each other in the insertion direction.

In the complex connector structure 1 of Example 2 as well, the position of the complex connector 15 attached to the drive device (not shown) is changed in the insertion direction toward the mating portions 3 in a fixed state, whereby each of the body portions 2 and the corresponding mating portion 3 are connected.

During a connection operation of connecting each of the body portions 2 and the corresponding mating portion 3, the complex connector 15 is disposed first as shown in FIG. 10 such that: the first body connection portion 21F of the first body portion 2F faces the first mating connection portion 31F of the first mating portion 3F; and the second body connection portion 21S of the second body portion 2S faces the second mating connection portion 31S of the second mating portion 3S.

At this time, the first body portion 2F and the first mating portion 3F have yet to be connected, and the second body portion 2S and the second mating portion 3S also have yet to be connected.

The position of the complex connector 15 is changed in the insertion direction toward the mating portions 3 by the drive device (not shown). Consequently, the first body portion 2F and the first mating portion 3F are connected first as shown in FIG. 11, whereby the compression amount in the radial direction of the first annular sealing member 4F interposed between the first body connection portion 21F and the first mating connection portion 31F becomes maximum. Then, the connection operation is further continued in the state where the first body portion 2F and the first mating portion 3F are connected. Consequently, the second body portion 2S and the second mating portion 3S are connected as shown in FIG. 12, whereby the compression amount in the radial direction of the second annular sealing member 4S interposed between the second body connection portion 21S and the second mating connection portion 31S becomes maximum.

Therefore, in the complex connector structure 1 of Example 2 as well, each of the position of the first annular sealing member 4F and the position of the first mating seal-equipped portion 32F equipped with the first annular sealing member 4F is substantially the position for connection between the first body connection portion 21F and the first mating connection portion 31F. Likewise, each of the position of the second annular sealing member 4S and the position of the second mating seal-equipped portion 32S equipped with the second annular sealing member 4S is substantially the position for connection between the second body connection portion 21S and the second mating connection portion 31S.

As shown in FIG. 10 to FIG. 12, in the complex connector structure 1 of Example 2, the first mating seal-equipped portion 32F is considered to be located on the front side in the insertion direction relative to the second mating seal-equipped portion 32S, and the position for connection between the first body connection portion 21F and the first mating connection portion 31F is considered to be on the front side relative to the position for connection between the second body connection portion 21S and the second mating connection portion 31S.

Therefore, in the complex connector structure 1 of Example 2 as well, the first annular sealing member 4F and the second annular sealing member 4S are compressed at different timings during the connection operation, whereby the peak of the connection operation load generated by compressing the first annular sealing member 4F and the peak of the connection operation load generated by compressing the second annular sealing member 4S are temporally shifted from each other. Consequently, abrupt and significant increase in the connection operation load is inhibited in the complex connector structure 1 of Example 2 as well.

Example 3

A complex connector structure of Example 3 satisfies the requirement (c) among the requirements of the first complex connector structure of the present disclosure.

The complex connector structure of Example 3 is substantially the same as the complex connector structure of Example 1, except that: the first body portion and the second body portion have substantially the same shape; and a front end portion of the first mating connection portion and a front end portion of the second mating connection portion are located at positions different from each other in the insertion direction.

Figure 13:
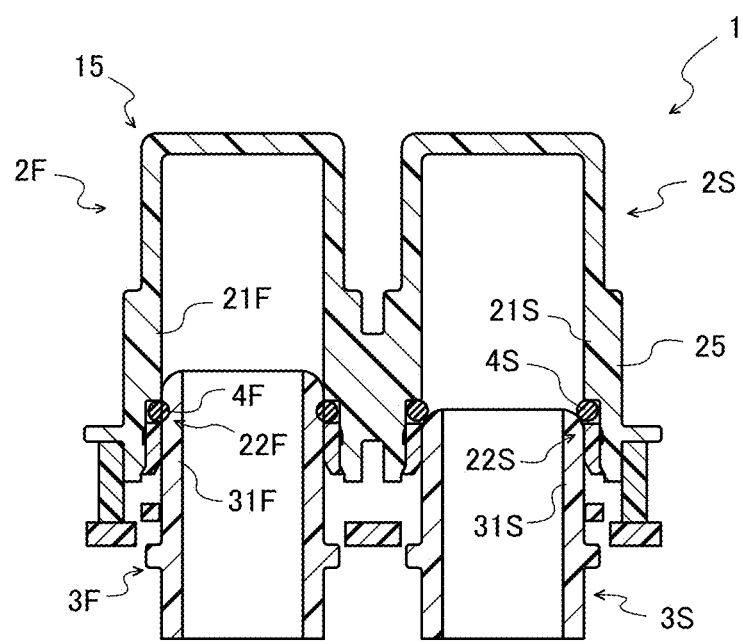
FIG. 13 is a diagram for schematically explaining a complex connector structure of Example 3 during a connection operation.

FIG. 13 is a diagram for schematically explaining the complex connector structure of Example 3 during a connection operation. FIG. 13 shows a state where, during the connection operation, the first body portion and the first mating portion are connected, and the second body portion and the second mating portion have yet to be connected.

Hereinafter, the complex connector structure of Example 3 will be described with focus being placed on the differences from the complex connector structure of Example 1.

As shown in FIG. 13, in the complex connector structure 1 of Example 3, the first body portion 2F and the second body portion 2S having the same shape are arranged to be parallel to each other and are integrated with each other by the coupling portion 25, to form a complex connector 15.

In the complex connector structure 1 of Example 3, the first body connection portion 21F has the first body seal-equipped portion 22F, and the second body connection portion 21S has the second body seal-equipped portion 22S. The first body seal-equipped portion 22F and the second body seal-equipped portion 22S are located at the same position in the insertion direction.

Each of the first mating portion 3F and the second mating portion 3S has the shape of a linear cylinder. The length in the axial direction (i.e., insertion direction) of the first mating connection portion 31F of the first mating portion 3F is slightly longer than the length in the axial direction (i.e., insertion direction) of the second mating connection portion 31S of the second mating portion 3S. However, in the complex connector structure 1 of Example 3, the first mating connection portion 31F does not have the first mating seal-equipped portion 32F, and the second mating connection portion 31S does not have the second mating seal-equipped portion 32S.

The first mating portion 3F and the second mating portion 3S are aligned with each other at the respective rear-side portions thereof, and the front-side portion of the first mating portion 3F is located on the front side relative to the front-side portion of the second mating portion 3S. Therefore, in the complex connector structure 1 of Example 3, the front end portion of the first mating connection portion 31F and the front end portion of the second mating connection portion 31S are located at positions different from each other in the insertion direction.

Meanwhile, as shown in FIG. 13, the front-side portion of each of the mating connection portions 31 is chamfered, and a part of the chamfered front-side portion is not in contact with the annular sealing member 4 with which the corresponding body connection portion 21 is equipped, in the complex connector structure 1 of Example 3. Therefore, in the complex connector structure 1 of Example 3, the front end portion of the mating connection portion 31 means a front end portion of the mating connection portion 31 excluding the chamfered front-side portion that is not in contact with the annular sealing member 4.

In the complex connector structure 1 of Example 3 as well, the position of the complex connector 15 attached to the drive device (not shown) is changed in the insertion direction toward the mating portions 3 in a fixed state, whereby each of the body portions 2 and the corresponding mating portion 3 are connected.

During a connection operation of connecting each of the body portions 2 and the corresponding mating portion 3, the complex connector 15 is disposed first such that: the first body connection portion 21F of the first body portion 2F faces the first mating connection portion 31F of the first mating portion 3F; and the second body connection portion 21S of the second body portion 2S faces the second mating connection portion 31S of the second mating portion 3S. At this time, the first body portion 2F and the first mating portion 3F have yet to be connected, and the second body portion 2S and the second mating portion 3S also have yet to be connected.

The position of the complex connector 15 is changed in the insertion direction toward the mating portions 3 by the drive device (not shown), to insert the mating connection portions 31 into the body connection portions 21. Consequently, the first body portion 2F and the first mating portion 3F are connected first as shown in FIG. 13, whereby the compression amount in the radial direction of the first annular sealing member 4F interposed between the first body connection portion 21F and the first mating connection portion 31F becomes maximum. At this time, the second body portion 2S and the second mating portion 3S have yet to be connected.

The connection operation is further continued in the state where the first body portion 2F and the first mating portion 3F are connected. Consequently, the second body portion 2S and the second mating portion 3S are connected, whereby the compression amount in the radial direction of the second annular sealing member 4S interposed between the second body connection portion 21S and the second mating connection portion 31S becomes maximum.

In this manner, in the complex connector structure 1 of Example 3, the position of the front end portion of the first mating connection portion 31F in contact with the first annular sealing member 4F is substantially the position for connection between the first body connection portion 21F and the first mating connection portion 31F. Likewise, the position of the front end portion of the second mating connection portion 31S in contact with the second annular sealing member 4S is substantially the position for connection between the second body connection portion 21S and the second mating connection portion 31S.

As described above, the front end portion of the first mating connection portion 31F and the front end portion of the second mating connection portion 31S are located at positions different from each other in the insertion direction. Therefore, in the complex connector structure 1 of Example 3 as well, the position for connection between the first body connection portion 21F and the first mating connection portion 31F and the position for connection between the second body connection portion 21S and the second mating connection portion 31S are considered to differ from each other in the insertion direction.

In such a complex connector structure 1 of Example 3 as well, the first annular sealing member 4F and the second annular sealing member 4S are compressed at different timings during the connection operation, whereby the peak of the connection operation load generated by compressing the first annular sealing member 4F and the peak of the connection operation load generated by compressing the second annular sealing member 4S are temporally shifted from each other. Consequently, abrupt and significant increase in the connection operation load is inhibited in the complex connector structure 1 of Example 3 as well.

Example 4

A complex connector structure of Example 4 satisfies the requirement (d) among the requirements of the first complex connector structure of the present disclosure.

The complex connector structure of Example 4 is substantially the same as the complex connector structure of Example 1, except that: the mating connection portion of each of the mating portions has a mating seal-equipped portion; and a front end portion of the first body connection portion and a front end portion of the second body connection portion are located at positions different from each other in the insertion direction.

Figure 14:
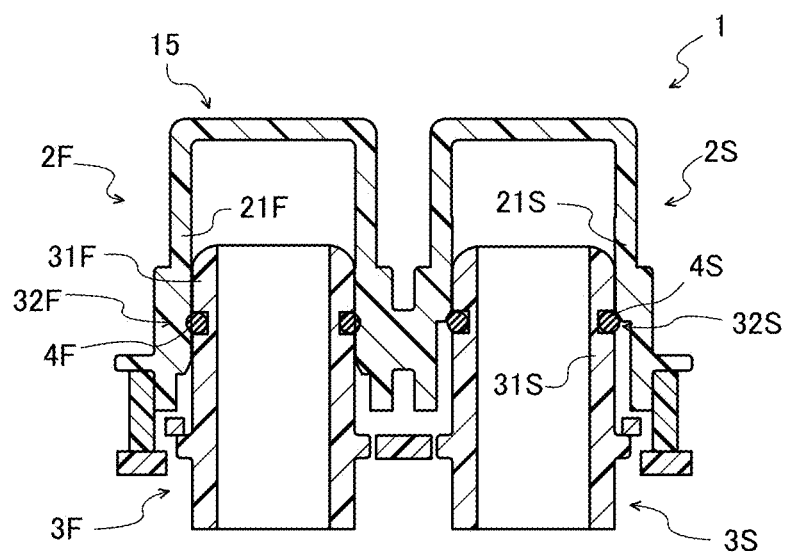
FIG. 14 is a diagram for schematically explaining a complex connector structure of Example 4 during a connection operation.

FIG. 14 is a diagram for schematically explaining the complex connector structure of Example 4 during a connection operation. FIG. 14 shows a state where, during the connection operation, the first body portion and the first mating portion are connected, and the second body portion and the second mating portion have yet to be connected.

Hereinafter, the complex connector structure of Example 4 will be described with focus being placed on the differences from the complex connector structure of Example 1.

As shown in FIG. 14, in the complex connector structure 1 of Example 4, the front end portion of the first body connection portion 21F and the front end portion of the second body connection portion 21S are located at positions different from each other in the insertion direction. More specifically, the front end portion of the first body connection portion 21F is located on the front side (i.e., the mating portion 3 side) in the insertion direction relative to the front end portion of the second body connection portion 21S.

In the complex connector structure 1 of Example 4, a front-side portion of each of the body connection portions 21 is chamfered, and, as shown in FIG. 14, a part of the chamfered front-side portion is not in contact with the annular sealing member 4 with which the corresponding mating connection portion 31 is equipped. Therefore, in the complex connector structure 1 of Example 4, the front end portion of the body connection portion 21 means a front end portion of the body connection portion 21 excluding the chamfered front-side portion that is not in contact with the annular sealing member 4.

The first mating portion 3F and the second mating portion 3S have substantially the same shape, the first mating connection portion 31F is provided with the first mating seal-equipped portion 32F, and the second mating connection portion 31S is provided with the second mating seal-equipped portion 32S. The first mating seal-equipped portion 32F and the second mating seal-equipped portion 32S are located at the same position in the insertion direction.

In the complex connector structure 1 of Example 4 as well, the position of the complex connector 15 attached to the drive device (not shown) is changed in the insertion direction toward the mating portions 3 in a fixed state, whereby each of the body portions 2 and the corresponding mating portion 3 are connected.

During a connection operation of connecting each of the body portions 2 and the corresponding mating portion 3, the complex connector 15 is disposed first such that: the first body connection portion 21F of the first body portion 2F faces the first mating connection portion 31F of the first mating portion 3F; and the second body connection portion 21S of the second body portion 2S faces the second mating connection portion 31S of the second mating portion 3S. At this time, the first body portion 2F and the first mating portion 3F have yet to be connected, and the second body portion 2S and the second mating portion 3S also have yet to be connected.

The position of the complex connector 15 is changed in the insertion direction toward the mating portions 3 by the drive device (not shown), to insert the mating connection portions 31 into the body connection portions 21. Consequently, the first body portion 2F and the first mating portion 3F are connected first as shown in FIG. 14, whereby the compression amount in the radial direction of the first annular sealing member 4F interposed between the first body connection portion 21F and the first mating connection portion 31F becomes maximum. At this time, the second body portion 2S and the second mating portion 3S have yet to be connected.

The connection operation is further continued in the state where the first body portion 2F and the first mating portion 3F are connected. Consequently, the second body portion 2S and the second mating portion 3S are connected, whereby the compression amount in the radial direction of the second annular sealing member 4S interposed between the second body connection portion 21S and the second mating connection portion 31S becomes maximum.

In this manner, in the complex connector structure 1 of Example 4, the position of the front end portion of the first body connection portion 21F in contact with the first annular sealing member 4F is substantially the position for connection between the first body connection portion 21F and the first mating connection portion 31F. Likewise, the position of the front end portion of the second body connection portion 21S in contact with the second annular sealing member 4S is substantially the position for connection between the second body connection portion 21S and the second mating connection portion 31S.

As described above, the front end portion of the first body connection portion 21F and the front end portion of the second body connection portion 21S are located at positions different from each other in the insertion direction. Therefore, in the complex connector structure 1 of Example 4 as well, the position for connection between the first body connection portion 21F and the first mating connection portion 31F and the position for connection between the second body connection portion 21S and the second mating connection portion 31S are considered to differ from each other in the insertion direction.

In such a complex connector structure 1 of Example 4 as well, the first annular sealing member 4F and the second annular sealing member 4S are compressed at different timings during the connection operation, whereby the peak of the connection operation load generated by compressing the first annular sealing member 4F and the peak of the connection operation load generated by compressing the second annular sealing member 4S are temporally shifted from each other. Consequently, abrupt and significant increase in the connection operation load is inhibited in the complex connector structure 1 of Example 4 as well.

Example 5

A complex connector structure of Example 5 has a tube inside provided with a fluid flow path. That is, the complex connector structure of Example 5 is considered as a flow path member that forms the fluid flow path.

In addition, the complex connector structure of Example 5 is a sequential-insertion-type complex connector structure that satisfies the requirement (a). Furthermore, a complex connector of Example 5 is a sequential-insertion-type complex connector that satisfies the requirement (e).

Figure 15:
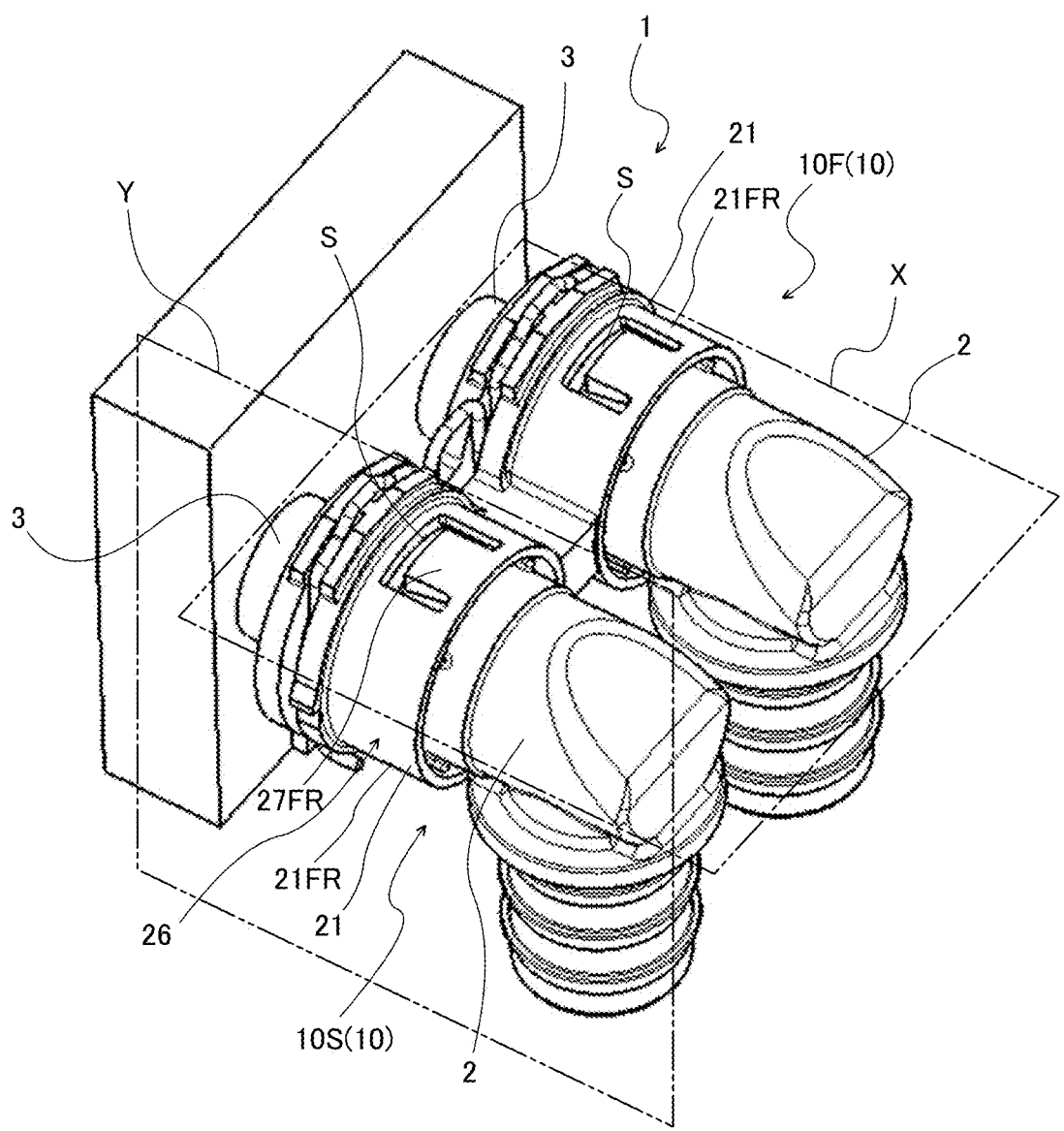
FIG. 15 is a diagram for schematically explaining a complex connector structure of Example 5.
Figure 16:
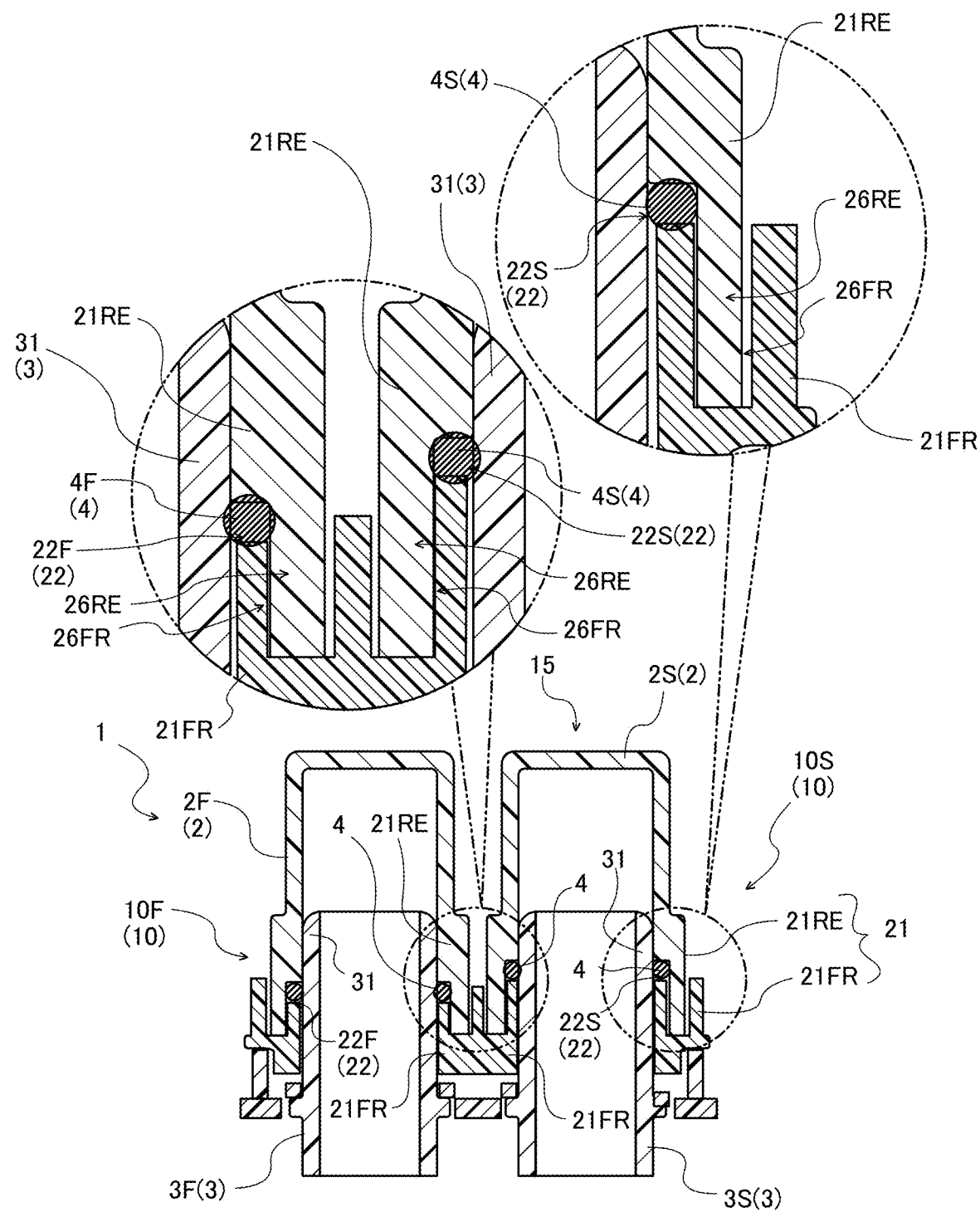
FIG. 16 is a diagram for schematically explaining a situation in which the complex connector structure of Example 5 has been cut at an X plane in FIG. 15.
Figure 17:
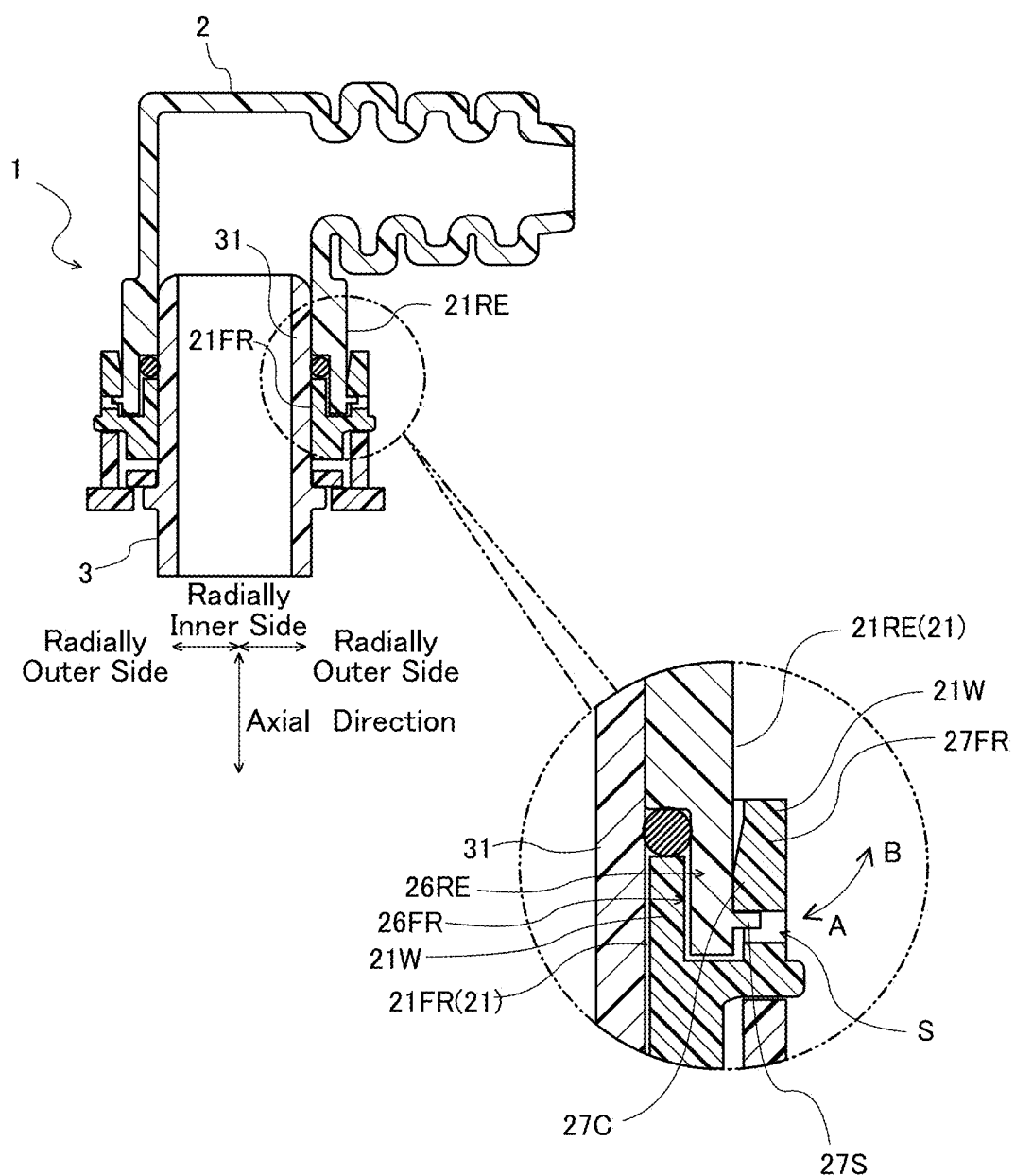
FIG. 17 is a diagram for schematically explaining a situation in which the complex connector structure of Example 5 has been cut at a Y plane in FIG. 15.
Figure 18:
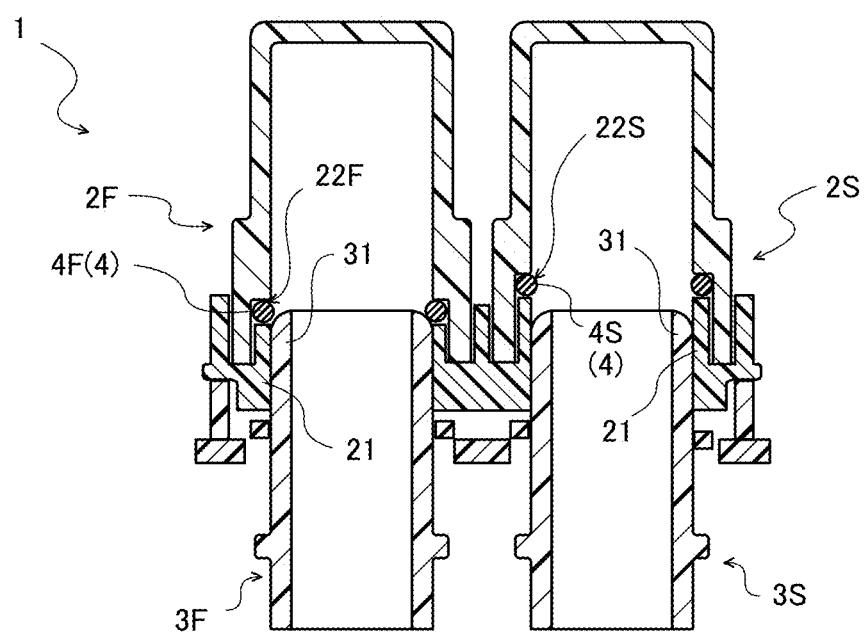
FIG. 18 is a diagram for schematically explaining the situation in which the complex connector structure of Example 5 has been cut at the X plane in FIG. 15.

FIG. 15 is a diagram for schematically explaining the complex connector structure of Example 5. FIG. 16 and FIG. 18 are each a diagram for schematically explaining a situation in which the complex connector structure of Example 5 has been cut at an X plane in FIG. 15. FIG. 17 is a diagram for schematically explaining a situation in which the complex connector structure of Example 5 has been cut at a Y plane in FIG. 15. FIG. 16 and FIG. 17 each show the complex connector structure of Example 5 for which a connection operation has been completed, and FIG. 18 shows the complex connector structure of Example 5 during the connection operation.

As shown in FIG. 16, the complex connector structure 1 of Example 5 includes two connector structure portions 10 each including: a body portion 2; a mating portion 3; and an annular sealing member 4. One of the two connector structure portions 10 is referred to as first connector structure portion 10F, and the other one is referred to as second connector structure portion 10S.

As shown in FIG. 16 to FIG. 18, in the complex connector structure 1 of Example 5, each of the body portions 2 and the corresponding mating portion 3 are connected by inserting a mating connection portion 31 of the mating portion 3 into a body connection portion 21 (described later) of the body portion 2 in the axial direction of the body connection portion 21.

As shown in FIG. 15, the body portion 2 in each of the connector structure portions 10 is, as a whole, in the form of a substantially L-shaped cylinder. A portion on one end side of the body portion 2 is the body connection portion 21 into which the corresponding mating portion 3 is inserted. A portion on the other end side of the body portion 2 is a hose joint connected to a hose (not shown) which is another mating portion 3.

As shown in FIG. 16, the body connection portion 21 is divided into a front-side divisional part 21FR having a short tubular shape and a rear-side divisional part 21RE having a short tubular shape. The front-side divisional part 21FR and the rear-side divisional part 21RE are coaxially arranged and are integrated with each other by a body assembling portion 26, whereby the body connection portion 21 having a tubular shape is formed. The front-side divisional part 21FR is located on the front side in the relative insertion direction of the body connection portion 21 for the mating connection portion 31, and the rear-side divisional part 21RE is located on the rear side in the relative insertion direction of the body connection portion 21 for the mating connection portion 31. The front-side divisional part 21FR is also considered to be located on the mating portion 3 side, and the rear-side divisional part 21RE is also considered to be located on the side opposite to the mating portion 3.

The front-side divisional part 21FR and the rear-side divisional part 21RE are considered to be arranged in the axial direction of the body connection portion 21 and are also considered to be arranged in the axial direction of the body portion 2.

The front-side divisional part 21FR and the rear-side divisional part 21RE are integrated with each other by the body assembling portion 26. The body assembling portion 26 is composed of a front-side body assembling portion 26FR which is a part of the front-side divisional part 21FR and a rear-side body assembling portion 26RE which is a part of the rear-side divisional part 21RE.

Out of these portions, the front-side body assembling portion 26FR is located at an end portion on the rear-side divisional part 21RE side (i.e., the side opposite to the mating portion 3) of the front-side divisional part 21FR. The front-side body assembling portion 26FR has the shape of a groove opened to the rear-side divisional part 21RE side and extending in the circumferential direction of the front-side divisional part 21FR over the entire circumference in this circumferential direction. The front-side body assembling portion 26FR is also considered to extend in the circumferential direction of the body connection portion 21.

The rear-side body assembling portion 26RE is located at an end portion on the front-side divisional part 21FR side (i.e., the mating portion 3 side) of the rear-side divisional part 21RE. The rear-side body assembling portion 26RE has the shape of a raised wall protruding to the front-side divisional part 21FR side and extending in the circumferential direction of the rear-side divisional part 21RE over the entire circumference in this circumferential direction. The rear-side body assembling portion 26RE is also considered to extend in the circumferential direction of the body connection portion 21.

The rear-side body assembling portion 26RE is inserted into the groove which is the front-side body assembling portion 26FR, whereby the front-side divisional part 21FR and the rear-side divisional part 21RE are integrated with each other, to form the body connection portion 21.

When the front-side divisional part 21FR and the rear-side divisional part 21RE are integrated with each other, a protruding end of the rear-side body assembling portion 26RE faces a groove bottom of the front-side body assembling portion 26FR and is brought into contact with this groove bottom. Therefore, the positions of the front-side body assembling portion 26FR and the rear-side body assembling portion 26RE are prevented from being changed in such a direction as to get close to each other in the axial direction of the body connection portion 21. In addition, the positions of the front-side divisional part 21FR having the front-side body assembling portion 26FR and the rear-side divisional part 21RE having the rear-side body assembling portion 26RE are also prevented from being changed in such a direction as to get close to each other in the axial direction of the body connection portion 21. Consequently, the change in relative position in such a direction that the front-side divisional part 21FR and the rear-side divisional part 21RE get close to each other is restricted.

The groove width of the front-side body assembling portion 26FR is larger than the thickness of the rear-side body assembling portion 26RE. Therefore, the position of the rear-side body assembling portion 26RE is enabled to be changed, in the radial direction of the body connection portion 21, inside the groove which is the front-side body assembling portion 26FR, and the position of the rear-side divisional part 21RE having the rear-side body assembling portion 26RE is also enabled to be changed in the radial direction of the body connection portion 21 relative to the front-side divisional part 21FR having the front-side body assembling portion 26FR. Consequently, change in the relative position between the front-side divisional part 21FR and the rear-side divisional part 21RE in the radial direction of the body connection portion 21 is allowed.

In the complex connector structure 1 of Example 5, the difference in length between the groove width of the front-side body assembling portion 26FR and the thickness of the rear-side body assembling portion 26RE is about 0.5 mm. This difference is a value that is equal to or smaller than the length in the extremely coarse class and that is equal to or larger than the length in the intermediate class in a case where a general tolerance defined in "JIS B 0405:1991" of the Japanese Industrial Standards is applied to the distance between the center line of the front-side divisional part 21FR having a tubular shape and the center line of the rear-side divisional part 21RE having a tubular shape.

Furthermore, the body assembling portion 26 in the complex connector structure 1 of Example 5 has, as shown in FIG. 15 and FIG. 17, a front-side engagement portion 27FR which is a part of the front-side divisional part 21FR and a rear-side engagement portion 27RE which is a part of the rear-side divisional part 21RE. The body assembling portion 26 in the complex connector structure 1 of Example 5 has two said front-side engagement portions 27FR and two said rear-side engagement portions 27RE. The two front-side engagement portions 27FR are disposed at positions opposed to each other. The two rear-side engagement portions 27RE are also disposed at positions opposed to each other. Each of the front-side engagement portions 27FR and the corresponding rear-side engagement portion 27RE face each other.

As shown in FIG. 17, the front-side engagement portion 27FR is a part of a groove wall of the front-side divisional part 21FR, the groove wall delimiting the front-side body assembling portion 26FR having the shape of a groove.

Specifically, the front-side body assembling portion 26FR having the shape of a groove is delimited by two groove walls arranged in two rows so as to be coaxial with each other. As shown in FIG. 15 and FIG. 17, the groove wall that is located on the radially outer side out of the two groove walls has a slit S which is substantially U-shaped, and the front-side engagement portion 27FR is implemented by a part having the shape of a beam in a cantilever configuration, the part being located inward of the slit S which is substantially U-shaped. As shown in FIG. 17, the front-side engagement portion 27FR is, about a portion thereof connected to the groove wall, elastically pivotable radially outward of the body connection portion 21 and pivotable radially inward by elastic restoring force.

The front-side engagement portion 27FR protrudes from the rear-side divisional part 21RE side of the above groove wall 21W toward the side opposite to the rear-side divisional part 21RE. In other words, the front-side engagement portion 27FR protrudes from the side opposite to the corresponding mating portion 3 toward the mating portion 3 side.

The front-side engagement portion 27FR has a protruding end at which a hook-shaped portion 27C protruding toward the radially inner side of the body connection portion 21, i.e., toward the inside of the groove which is the front-side body assembling portion 26FR, is formed.

As shown in FIG. 17, the rear-side engagement portion 27RE is substantially plate-shaped and protrudes from the outer circumferential surface of the rear-side body assembling portion 26RE toward the radially outer side of the rear-side body assembling portion 26RE, i.e., toward the radially outer side of the body connection portion 21. At the time of forming the body connection portion 21 by integrating the front-side divisional part 21FR and the rear-side divisional part 21RE with each other, the rear-side engagement portion 27RE and the front-side engagement portion 27FR get close to each other in the axial direction of the body connection portion 21.

At this time, the rear-side engagement portion 27RE presses the front-side engagement portion 27FR to the radially outer side of the body connection portion 21, and the front-side engagement portion 27FR pressed by the rear-side engagement portion 27RE pivots in the direction B in FIG. 17 toward the radially outer side of the body connection portion 21. When the rear-side engagement portion 27RE enters the slit of the front-side body assembling portion 26FR, the front-side engagement portion 27FR is released from the state of being pressed by the rear-side engagement portion 27RE and pivots in the direction A in FIG. 17 toward the radially inner side of the body connection portion 21 by elastic restoring force. Thus, the hook-shaped portion 27C of the front-side engagement portion 27FR and the rear-side engagement portion 27RE are engaged with each other.

Consequently, the positions of the front-side engagement portion 27FR and the rear-side engagement portion 27RE become less likely to be changed in such a direction as to be shifted away from each other in the axial direction of the body connection portion 21. In addition, the positions of the front-side divisional part 21FR having the front-side engagement portion 27FR and the rear-side divisional part 21RE having the rear-side engagement portion 27RE also become less likely to be changed in such a direction as to be shifted away from each other in the axial direction of the body connection portion 21.

In the complex connector structure 1 of Example 5, the body assembling portions 26 of the first connector structure portion 10F and the second connector structure portion 10S each allow, with independence between these connector structure portions being achieved, change in the relative position between the front-side divisional part 21FR and the rear-side divisional part 21RE in the radial direction of the corresponding body connection portion 21 and each restrict, with independence between these connector structure portions being achieved, change in the relative position between the front-side divisional part 21FR and the rear-side divisional part 21RE in the axial direction of the corresponding body connection portion 21.

In the complex connector structure 1 of Example 5, the body assembling portion 26 restricts change in the relative position between the front-side divisional part 21FR and the rear-side divisional part 21RE in the axial direction of the body connection portion 21. Consequently, in the complex connector structure 1 of Example 5, the front-side divisional part 21FR and the rear-side divisional part 21RE are integrated with each other with high reliability, and hence the shape of the body connection portion 21 and the shape of the body portion 2 are maintained with high reliability.

In addition, the body assembling portion 26 allows change in the relative position between the front-side divisional part 21FR and the rear-side divisional part 21RE in the radial direction of the body connection portion 21. Consequently, the complex connector structure 1 of Example 5 enables, during a connection operation between each of the body portions 2 and the corresponding mating portion 3, the positions of the front-side divisional part 21FR and the rear-side divisional part 21RE to be changed relative to each other in the radial direction of the body connection portion 21.

In the complex connector structure 1 of Example 5, displacement of the relative position between the plurality of body portions 2, displacement of the relative position between the plurality of mating portions 3, displacement of the relative position between each of the body portions 2 and the corresponding mating portion 3, or the like sometimes occurs in the same manner as in a conventional complex connector structure 1.

However, the complex connector structure 1 of Example 5 enables the positions of the front-side divisional part 21FR and the rear-side divisional part 21RE to be changed relative to each other in the radial direction of the body connection portion 21. Thus, when any of the above displacements between the portions occurs, the positions of the front-side divisional part 21FR and the rear-side divisional part 21RE are changed relative to each other during a connection operation between the body portion 2 and the mating portion 3, whereby the displacement between the portions is accommodated and allowed. Consequently, the complex connector structure 1 of Example 5 enables a connection operation between each of the body portions 2 and the corresponding mating portion 3 to be easily performed while allowing displacement of the relative positions between the portions.

In addition, as shown in FIG. 16, the plurality of body portions 2 in the complex connector structure 1 of Example 5 are integrated with each other at the respective front-side divisional parts 21FR. Each of the front-side divisional parts 21FR is a part of the corresponding body connection portion 21, the part being located on the mating portion 3 side and being enabled to be positioned relative to the mating portion 3 with high reliability. Consequently, the complex connector structure 1 of Example 5 enables the body connection portion 21 of each of the plurality of body portions 2 to be positioned relative to the mating connection portion 31 of the corresponding mating portion 3 with high reliability and enables the body portion 2 and the mating portion 3 to be easily integrated with each other with high accuracy.

Meanwhile, in the complex connector structure 1 of Example 5, each of the body connection portions 21 has a body seal-equipped portion 22 on one end side thereof. The body seal-equipped portion 22 is an annular groove opened on the inner circumferential surface of the body portion 2.

More specifically, in the complex connector structure 1 of Example 5, each of the body connection portions 21 has the front-side divisional part 21FR and the rear-side divisional part 21RE between which a groove extending in the circumferential direction of the body connection portion 21 is formed. The groove serves as the body seal-equipped portion 22. The corresponding annular sealing member 4 is housed in this body seal-equipped portion 22. Therefore, this annular sealing member 4 is considered to be interposed between the front-side divisional part 21FR and the rear-side divisional part 21RE and between the body connection portion 21 and the corresponding mating connection portion 31.

As shown in FIG. 16, in the complex connector structure 1 of Example 5, the first body portion 2F which is the body portion 2 of the first connector structure portion 10F and the second body portion 2S which is the body portion 2 of the second connector structure portion 10S have substantially cylindrical shapes and are arranged such that the axial directions thereof are parallel to each other. The first body portion 2F and the second body portion 2S are adjacent to each other. As described above, the first body portion 2F and the second body portion 2S are integrated with each other at the respective front-side divisional parts 21FR. Consequently, the first body portion 2F and the second body portion 2S form the complex connector 15.

As shown in FIG. 16, the first mating portion 3F belonging to the first connector structure portion 10F is inserted into the first body portion 2F belonging to the first connector structure portion 10F. The second mating portion 3S belonging to the second connector structure portion 10S is inserted into the second body portion 2S belonging to the second connector structure portion 10S.

The first mating portion 3F and the second mating portion 3S have substantially the same shape which is the shape of a linear cylinder.

The body seal-equipped portion 22 belonging to the first connector structure portion 10F is referred to as first body seal-equipped portion 22F, and the body seal-equipped portion 22 belonging to the second connector structure portion 10S is referred to as second body seal-equipped portion 22S.

Each of the first body seal-equipped portion 22F and the second body seal-equipped portion 22S is equipped with one annular sealing member 4. Hereinafter, as necessary, the annular sealing member 4 with which the first body seal-equipped portion 22F is equipped is referred to as first annular sealing member 4F, and the annular sealing member 4 with which the second body seal-equipped portion 22S is equipped is referred to as second annular sealing member 4S.

Each of the annular sealing members 4 is a so-called O-ring formed of nitrile rubber and having an annular shape. The annular sealing member 4 has: a majority portion present in the corresponding body seal-equipped portion 22; and another portion exposed from this body seal-equipped portion 22 to the tube inside of the body portion 2.

The inner diameter of each of the annular sealing members 4 is slightly smaller than the outer diameter of the corresponding mating connection portion 31, and the outer diameter of the annular sealing member 4 is slightly larger than the inner diameter of the corresponding body connection portion 21.

In the complex connector structure 1 of Example 5, the first body seal-equipped portion 22F is located on the front side (i.e., the mating portion 3 side) in the insertion direction (i.e., the axial direction of the body connection portion 21) relative to the second body seal-equipped portion 22S. The distance in the insertion direction between the first body seal-equipped portion 22F and the second body seal-equipped portion 22S is about $5/2$ of the length in the axial direction of each of the annular sealing members 4 in a natural state.

In the present specification, the distance in the insertion direction between the first body seal-equipped portion 22F and the second body seal-equipped portion 22S means the distance in the insertion direction between the center of the first body seal-equipped portion 22F in the insertion direction and the center of the second body seal-equipped portion 22S in the same insertion direction. The insertion direction is identical to the axial direction of each of the body connection portions 21 and also identical to the axial direction of each of the mating connection portions 31.

In the complex connector structure 1 of Example 5, the complex connector 15 is attached to the drive device (not shown). The position of the complex connector 15 attached to the drive device is changed in the insertion direction toward the mating portions 3 in a fixed state, whereby each of the body portions 2 and the corresponding mating portion 3 are connected.

During a connection operation of connecting each of the body portions 2 and the corresponding mating portion 3, the complex connector 15 is disposed first as shown in FIG. 18 such that: the body connection portion 21 of the first body portion 2F faces the mating connection portion 31 of the first mating portion 3F; and the body connection portion 21 of the second body portion 2S faces the mating connection portion 31 of the second mating portion 3S.

At this time, the first body portion 2F and the first mating portion 3F have yet to be connected, and the second body portion 2S and the second mating portion 3S also have yet to be connected.

Then, the position of the complex connector 15 is changed in the insertion direction toward the mating portions 3 by the drive device (not shown), to insert the mating connection portions 31 into the body connection portions 21.

As described above, the first body seal-equipped portion 22F is located on the front side (i.e., the mating portion 3 side) relative to the second body seal-equipped portion 22S. Therefore, the first annular sealing member 4F with which the first body seal-equipped portion 22F is equipped is located on the front side in the insertion direction relative to the second annular sealing member 4S with which the second body seal-equipped portion 22S is equipped.

The first annular sealing member 4F and the second annular sealing member 4S are compressed in the radial direction during the connection operation, and the compression amounts thereof in the radial direction each become maximum during the connection.

Therefore, in the complex connector structure of Example 5, each of the position of the first annular sealing member 4F and the position of the first body seal-equipped portion 22F equipped with the first annular sealing member 4F is substantially the position for connection between the body connection portion 21 of the first body portion 2F and the mating connection portion 31 of the first mating portion 3F.

Likewise, each of the position of the second annular sealing member 4S and the position of the second body seal-equipped portion 22S equipped with the second annular sealing member 4S is substantially the position for connection between the body connection portion 21 of the second body portion 2S and the mating connection portion 31 of the second mating portion 3S.

Therefore, the position for connection between the body connection portion 21 of the first body portion 2F and the mating connection portion 31 of the first mating portion 3F is considered to be on the front side (i.e., the mating portion 3 side) in the insertion direction relative to the position for connection between the body connection portion 21 of the second body portion 2S and the mating connection portion 31 of the second mating portion 3S.

During a connection operation, the first body portion 2F and the first mating portion 3F are connected first as shown in FIG. 18, whereby the compression amount in the radial direction of the first annular sealing member 4F interposed between the body connection portion 21 of the first body portion 2F and the mating connection portion 31 of the first mating portion 3F becomes maximum.

Then, the connection operation is further continued in the state where the first body portion 2F and the first mating portion 3F are connected. Consequently, the second body portion 2S and the second mating portion 3S are connected as shown in FIG. 16, whereby the compression amount in the radial direction of the second annular sealing member 4S interposed between the body connection portion 21 of the second body portion 2S and the mating connection portion 31 of the second mating portion 3S becomes maximum.

The complex connector structure 1 of Example 5 has a complex connector 15 in which the first body portion 2F and the second body portion 2S are integrated with each other. However, the first body seal-equipped portion 22F and the second body seal-equipped portion 22S are located at positions different from each other in the insertion direction, and hence the position for connection between the body connection portion 21 of the first body portion 2F and the mating connection portion 31 of the first mating portion 3F and the position for connection between the body connection portion 21 of the second body portion 2S and the mating connection portion 31 of the second mating portion 3S differ from each other in the insertion direction.

In such a complex connector structure 1 of Example 5, the first annular sealing member 4F and the second annular sealing member 4S are compressed at different timings during the connection operation, whereby the peak of the connection operation load generated by compressing the first annular sealing member 4F and the peak of the connection operation load generated by compressing the second annular sealing member 4S are temporally shifted from each other.

In other words, in the complex connector structure 1 of Example 5, the body connection portion 21 (first body connection portion) of the first body portion 2F and the mating connection portion 31 (first mating connection portion) of the first mating portion 3F are disposed at the corresponding connection position first, during a connection operation. Then, the body connection portion 21 (second body connection portion) of the second body portion 2S and the mating connection portion 31 (second mating connection portion) of the second mating portion 3S are disposed at the corresponding connection position. Thus, the timing at which the compression amount in the radial direction of the annular sealing member 4 becomes maximum differs between the first connector structure portion 10F and the second connector structure portion 10S.

Consequently, the connection operation load of connecting each of the body portions 2 and the corresponding mating portion 3 is, as a whole, prevented from abruptly and significantly increasing in the complex connector structure 1 of Example 5.

As a result, the complex connector structure 1 of Example 5 enables a connection operation between the body portion 2 and the mating portion 3 to be easily performed even though: the complex connector structure 1 has a complex connector 15; and the connection operation between the body portion 2 and the mating portion 3 is performed through a single operation.

Although the present disclosure has been described above, the present disclosure is not limited to the above-described embodiments, etc., elements described in the embodiments, etc., may be optionally extracted and combined to carry out the present disclosure, and various changes may be made without departing from the gist of the present disclosure.

In addition, the specification of the present disclosure discloses not only the technical concept indicated by the citation relationship between the claims as originally filed, but also the technical concept obtained by combining the matters recited in the claims as appropriate.

The invention claimed is:

1. A complex connector structure comprising
a plurality of connector structure portions each including:
   a body portion having a tubular shape;
   a mating portion connected to the body portion; and
   an annular sealing member interposed between the body portion and the mating portion, wherein
the body portions are integrated with each other to form a complex connector,
each of the body portions and the corresponding mating portion are connected by inserting the mating connection portion into the body connection portion,
the annular sealing member is, when the body portion and the mating portion are connected, disposed between the body connection portion and the mating connection portion in a state where the annular sealing member is compressed in a radial direction thereof, and
a timing at which a compression amount in the radial direction of the annular sealing member becomes maximum during a connection operation between the body portion and the mating portion differs between a first connector structure portion which is one of the connector structure portions and a second connector structure portion which is another one of the connector structure portions.

2. The complex connector structure according to claim 1, wherein the complex connector structure satisfies one of the following requirements (a) to (d):
   (a) a requirement that
      each of the body connection portions has a body seal-equipped portion equipped with the corresponding annular sealing member in advance, and
      the body seal-equipped portion of a first body portion which is one of the body portions and which is included in the first connector structure portion and the body seal-equipped portion of a second body portion which is another one of the body portions and which is included in the second connector structure portion are located at positions different from each other in a relative insertion direction for the body connection portions and the mating connection portions;
   (b) a requirement that
      each of the mating connection portions has a mating seal-equipped portion equipped with the corresponding annular sealing member in advance, and
      the mating seal-equipped portion of a first mating portion which is one of the mating portions and which is included in the first connector structure portion and the mating seal-equipped portion of a second mating portion which is another one of the mating portions and which is included in the second connector structure portion are located at positions different from each other in a relative insertion direction for the body connection portions and the mating connection portions;
   (c) a requirement that
      each of the body connection portions has a body seal-equipped portion equipped with the corresponding annular sealing member in advance, and
      a front end portion of the mating connection portion of a first mating portion which is one of the mating portions and which is included in the first connector structure portion and a front end portion of the mating connection portion of a second mating portion which is another one of the mating portions and which is included in the second connector structure portion are located at positions different from each other in a relative insertion direction for the body connection portions and the mating connection portions; or (d) a requirement that each of the mating connection portions has a mating seal-equipped portion equipped with the corresponding annular sealing member in advance, and a front end portion of the body connection portion of a first body portion which is one of the body portions and which is included in the first connector structure portion and a front end portion of the body connection portion of a second body portion which is another one of the body portions and which is included in the second connector structure portion are located at positions different from each other in a relative insertion direction for the body connection portions and the mating connection portions.

3. The complex connector structure according to claim 2, wherein the complex connector structure satisfies the requirement (a), and a distance in the insertion direction between the body seal-equipped portion of the first body portion and the body seal-equipped portion of the second body portion is equal to or longer than ½ of a length in an axial direction of each of the annular sealing members in a natural state.

4. The complex connector structure according to claim 2, wherein the complex connector structure satisfies the requirement (b), and a distance in the insertion direction between the mating seal-equipped portion of the first mating portion and the mating seal-equipped portion of the second mating portion is equal to or longer than ½ of a length in an axial direction of each of the annular sealing members in a natural state.

5. The complex connector structure according to claim 2, wherein the complex connector structure satisfies the requirement (c), and a distance in the insertion direction between the front end portion of the mating connection portion of the first mating portion and the front end portion of the mating connection portion of the second mating portion is equal to or longer than ½ of a length in an axial direction of each of the annular sealing members in a natural state.

6. The complex connector structure according to claim 2, wherein the complex connector structure satisfies the requirement (d), and a distance in the insertion direction between the front end portion of the body connection portion of the first body portion and the front end portion of the body connection portion of the second body portion is equal to or longer than ½ of a length in an axial direction of each of the annular sealing members in a natural state.

7. The complex connector according to claim 3, wherein the complex connector satisfies the requirement (e), and a distance in the insertion direction between the body seal-equipped portion of the first body portion and the body seal-equipped portion of the second body portion is equal to or longer than ½ of a length in an axial direction of each of the annular sealing members in a natural state.

8. The complex connector structure according to claim 2, wherein a body portion that is adjacent to the first body portion among the body portions is the second body portion, and the complex connector structure satisfies the requirement (a) or (d).

9. A complex connector comprising a plurality of body portions each having a tubular shape, the plurality of body portions being integrated with each other, wherein each of the body portions has a body connection portion into which the mating connection portion is inserted, and the complex connector satisfies the following requirement (e) or (f):

(e) a requirement that each of the body connection portions has a body seal-equipped portion equipped with an annular sealing member in advance, and the body seal-equipped portion of a first body portion which is one of the body portions and the body seal-equipped portion of a second body portion which is another one of the body portions are located at positions different from each other in a relative insertion direction for the body connection portions and the mating connection portions; or (f) a requirement that none of the body connection portions has a body seal-equipped portion equipped with an annular sealing member in advance, and a front end portion of the body connection portion of a first body portion which is one of the body portions and a front end portion of the body connection portion of a second body portion which is another one of the body portions are located at positions different from each other in a relative insertion direction for the body connection portions and the mating connection portions.

10. The complex connector according to claim 9, wherein the complex connector satisfies the requirement (f), and a distance in the insertion direction between the front end portion of the body connection portion of the first body portion and the front end portion of the body connection portion of the second body portion is equal to or longer than ½ of a length in an axial direction of each of the annular sealing members in a natural state.

11. The complex connector according to claim 9, wherein a body portion that is adjacent to the first body portion among the body portions is the second body portion.

12. A complex connector structure comprising:

a plurality of body portions each having a body connection portion having a tubular shape;

a plurality of mating portions each having a mating connection portion which is inserted into the corresponding body connection portion; and a plurality of annular sealing members each interposed, when the corresponding body portion and the corresponding mating portion are connected, between the body connection portion of the body portion and the mating connection portion of the mating portion in a state where the annular sealing member is compressed in a radial direction thereof, wherein the plurality of body portions are integrated with each other, and the plurality of mating portions are integrated with each other, each of the body connection portions has
- a front-side divisional part having a tubular shape and located on a front side in a relative insertion direction for the corresponding mating connection portion,
- a rear-side divisional part having a tubular shape and located on a rear side in the relative insertion direction for the mating connection portion, and
- a body assembling portion integrating the front-side divisional part and the rear-side divisional part with each other, and the body assembling portion of each of the body connection portions allows change in a relative position between the front-side divisional part and the rear-side divisional part in a radial direction of the body connection portion and restricts change in a relative position between the front-side divisional part and the rear-side divisional part in an axial direction of the body connection portion.

13. The complex connector structure according to claim 12, wherein each of the annular sealing members is interposed between the corresponding front-side divisional part and the corresponding rear-side divisional part and between the corresponding body connection portion and the corresponding mating connection portion.

14. The complex connector structure according to claim 12, wherein the plurality of body portions are integrated with each other at the respective front-side divisional parts.

15. The complex connector structure according to claim 12, wherein
- the body assembling portion has
  - a front-side body assembling portion located at an end portion on the rear-side divisional part side of the front-side divisional part, and
  - a rear-side body assembling portion located at an end portion on the front-side divisional part side of the rear-side divisional part,
- the front-side body assembling portion has a shape of a groove opened to the rear-side divisional part side and extending in a circumferential direction of the front-side divisional part,
- the rear-side body assembling portion has a shape of a raised wall protruding to the front-side divisional part side and extending in a circumferential direction of the rear-side divisional part,
- a groove width of the front-side body assembling portion is larger than a thickness of the rear-side body assembling portion, and,
- when the front-side divisional part and the rear-side divisional part are integrated with each other,
  - the rear-side body assembling portion is inserted into the groove which is the front-side body assembling portion, and
  - a protruding end of the rear-side body assembling portion faces a groove bottom of the front-side body assembling portion.

16. The complex connector structure according to claim 12, wherein
- the body assembling portion has
  - a front-side body assembling portion located at an end portion on the rear-side divisional part side of the front-side divisional part, and
  - a rear-side body assembling portion located at an end portion on the front-side divisional part side of the rear-side divisional part,
- the rear-side body assembling portion has a shape of a groove opened to the front-side divisional part side and extending in a circumferential direction of the rear-side divisional part,
- the front-side body assembling portion has a shape of a raised wall protruding to the rear-side divisional part side and extending in a circumferential direction of the front-side divisional part,
- a groove width of the rear-side body assembling portion is larger than a thickness of the front-side body assembling portion, and,
- when the front-side divisional part and the rear-side divisional part are integrated with each other,
  - the front-side body assembling portion is inserted into the groove which is the rear-side body assembling portion, and
  - a protruding end of the front-side body assembling portion faces a groove bottom of the rear-side body assembling portion.

17. The complex connector structure according to claim 12, comprising
- a plurality of connector structure portions each including
  - the corresponding body portion,
  - the corresponding mating portion connected to the body portion, and
  - the corresponding annular sealing member interposed between the body portion and the mating portion, wherein
- a timing at which a compression amount in the radial direction of the annular sealing member becomes maximum during a connection operation between the body portion and the mating portion differs between a first connector structure portion which is one of the connector structure portions and a second connector structure portion which is another one of the connector structure portions.

18. A complex connector comprising
a plurality of body portions each having a body connection portion having a tubular shape, the plurality of body portions being integrated with each other, wherein
the body connection portion of each of the body portions is configured such that the mating connection portion is inserted into the body connection portion,
the body connection portion has
- a front-side divisional part having a tubular shape and located on a front side in a relative insertion direction for the mating connection portion,
- a rear-side divisional part having a tubular shape and located on a rear side in the relative insertion direction for the mating connection portion, and
- a body assembling portion integrating the front-side divisional part and the rear-side divisional part with each other, and the body assembling portion of each of the body connection portions allows change in a relative position between the front-side divisional part and the rear-side divisional part in a radial direction of the body connection portion and restricts change in a relative position between the front-side divisional part and the rear-side divisional part in an axial direction of the body connection portion.

* * * * *